United States Patent
Hirai

(10) Patent No.: US 7,502,085 B2
(45) Date of Patent: Mar. 10, 2009

(54) DISPLAY DEVICE HAVING FUNCTIONAL TRANSPARENT PLATE IN PRISMATIC STRUCTURE ON RETARDER PROVIDED ON POLARIZER ABOVE DISPLAY PANEL ASSEMBLY

(75) Inventor: Akira Hirai, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 424 days.

(21) Appl. No.: 11/404,232

(22) Filed: Apr. 14, 2006

(65) Prior Publication Data

US 2006/0238679 A1    Oct. 26, 2006

(30) Foreign Application Priority Data

Apr. 26, 2005   (KR) ...................... 10-2005-0034414
Apr. 26, 2005   (KR) ...................... 10-2005-0034416

(51) Int. Cl.
G02F 1/1335   (2006.01)

(52) U.S. Cl. ............................... 349/117; 349/96; 349/9

(58) Field of Classification Search ................. 349/117, 349/96, 9, 114, 113
See application file for complete search history.

(56) References Cited

U.S. PATENT DOCUMENTS

| | | | | |
|---|---|---|---|---|
| 5,712,694 | A | * | 1/1998 | Taira et al. ...................... 349/9 |
| 6,166,787 | A | * | 12/2000 | Akins et al. ..................... 349/57 |
| 6,707,519 | B1 | | 3/2004 | Okumura et al. |
| 6,847,425 | B2 | | 1/2005 | Tanada et al. |
| 6,989,875 | B2 | * | 1/2006 | Yoon ............................. 349/96 |
| 2005/0041180 | A1 | | 2/2005 | Ozawa |

FOREIGN PATENT DOCUMENTS

| | | |
|---|---|---|
| JP | 07-043506 | 2/1995 |
| JP | 09-189811 | 7/1997 |
| JP | 2000-098364 | 4/2000 |
| JP | 2000-113705 | 4/2000 |
| JP | 2000-113707 | 4/2000 |
| JP | 2001-083509 | 3/2001 |
| JP | 2001-228333 | 8/2001 |
| JP | 2001-337207 | 12/2001 |
| JP | 2001-356344 | 12/2001 |
| JP | 2002-006134 | 1/2002 |
| JP | 2002-014336 | 1/2002 |
| JP | 2002-072196 | 3/2002 |
| JP | 2002072196 A * | 3/2002 |
| JP | 2002-202506 | 7/2002 |
| JP | 2003-177236 | 6/2003 |
| JP | 2004-125885 | 4/2004 |
| JP | 2004-177591 | 6/2004 |
| KR | 1020040015307 | 2/2004 |
| KR | 1020040020798 | 3/2004 |
| KR | 1020040055932 | 6/2004 |
| KR | 1020040084205 | 10/2004 |
| KR | 1020050014594 | 2/2005 |

* cited by examiner

Primary Examiner—Mike Qi
(74) Attorney, Agent, or Firm—Cantor Colburn LLP

(57) ABSTRACT

An optical system consisting of a reflective polarizer, a λ/4 retarder, and a functional transparent plate with first facets and second facets which is provided on a display panel assembly improves utilization efficiency of exterior light, so that display luminance of a reflective or a transmissive LCD operating in a reflection mode is improved. In another embodiment, an optical system consisting of a λ/4 retarder, a selective reflection layer, and a functional transparent plate with first facets and second facets may be used.

68 Claims, 21 Drawing Sheets

DISPLAY DEVICE HAVING FUNCTIONAL TRANSPARENT PLATE IN PRISMATIC STRUCTURE ON RETARDER PROVIDED ON POLARIZER ABOVE DISPLAY PANEL ASSEMBLY

BACKGROUND OF THE INVENTION (a) Field of the Invention

The present invention relates to a transflective liquid crystal display or a reflective liquid crystal display.

(b) Description of the Related Art

Generally, a liquid crystal display (LCD) includes a pair of panels individually having electrodes on their inner surfaces, and a dielectric anisotropy liquid crystal (LC) layer interposed between the panels. In an LCD, a variation of a voltage difference between the field generating electrodes, i.e., a variation in the strength of an electric field generated by the electrodes, changes the transmittance of light passing through the LCD, and thus desired images are obtained by controlling the voltage difference between the electrodes.

Depending on the kinds of light source used for image display, LCDs are divided into three types: transmissive, reflective, and transflective. In transmissive LCDs, pixels are illuminated from behind using a backlight. In reflective LCDs, the pixels are illuminated from the front using incident light originating from the ambient environment. The transflective LCDs combine transmissive and reflective characteristics. Under medium light conditions such as in an indoor environment, or under complete darkness conditions, these LCDs are operated in a transmissive mode, while under very bright conditions such as in an outdoor environment, they are operated in a reflective mode.

In the reflective LCDs and the transflective LCDs, two absorbing polarizers, which are films produced by adding iodine molecules or bichromatic dyes to stretched PVA, are individually attached to the outer surfaces of the panels. In general, the absorbing polarizers have unique optical characteristics. That is, they allow only P-waves of incident light to pass and absorb S-waves. Theoretically, an absorbing polarizer transmits 50% of incident light and absorbs the remaining 50%. However, the absorbing polarizer actually transmits only 43% to 45% due to a light loss at its surface. In the case when the light passing through the absorbing polarizer is returned to the same polarizer again by reflection at a reflective electrode, the transmittance of the light passing through the polarizer again is only 39% to 41%, even if the reflectance at the reflective electrode is 100% and the color filters cause no light loss. Accordingly, the actual transmittance is less than 39% to 41% because the color filters used for the color display cause a light loss and also because the actual reflectance at the reflective electrode is not 100%.

SUMMARY OF THE INVENTION

An objective of the present invention is to improve visibility and display luminance of an LCD operating in reflective mode.

To achieve the objective, a reflective LCD or an transmissive LCD of the present invention utilizes an optical system consisting of a reflective polarizer, a $\lambda/4$ retarder, and a functional transparent plate with first facets and second facets, which are disposed on a display panel assembly in that order. Otherwise, another optical system may be utilized, which consists of a $\lambda/4$ retarder, a selective reflection layer, and a functional transparent plate with first facets and second facets, which are disposed on a display panel assembly in that order.

In detail, according to an aspect of the present invention, there is provided a display device including: a display panel assembly; a reflective polarizer that is provided above the display panel assembly to transmit external incident light which is linearly polarized in a first direction and to reflect external incident light which is linearly polarized in a second direction perpendicular to the first direction; a first $\lambda/4$ retarder that is provided on the reflective polarizer; and a functional transparent plate that is provided on the first $\lambda/4$ retarder and which has a top surface including portions without a cholesteric liquid crystal material and portions with a cholesteric liquid crystal material.

The display device may further include a second $\lambda/4$ retarder that is provided between the reflective polarizer and the display panel assembly, a first absorbing polarizer that is provided between the second $\lambda/4$ retarder and the reflective polarizer, a second absorbing polarizer that is provided under the display panel assembly, and a third $\lambda/4$ retarder that is provided between the second absorbing polarizer and the display panel assembly.

The reflective polarizer may be utilize a dual brightness enhancement film (DBEF) that is produced based on reflectance anisotropy caused by refractive index anisotropy, or delicate linear patterns.

The display device may further include a backlight unit that is provided under the display panel assembly.

In this device, the display panel assembly, the reflective polarizer, the first $\lambda/4$ retarder, and the functional transparent plate may be bonded by an adhesive agent.

Between the functional transparent plate and the first $\lambda/4$ retarder, spaces may be formed due to a surface structure of either of a bottom surface of the functional transparent plate or a top surface of the first $\lambda/4$ retarder, and these spaces may be filled with a filling material with a refractive index that is equal to an average of refractive indices of the functional transparent plate and the first $\lambda/4$ retarder. As the filling material for the spaces, an organic silicon-based material such as silicon resin may be used.

The display panel assembly includes an LC layer. LC molecules in the LC layer may be aligned in a 90°-twisted nematic (TN) mode, a vertical alignment (VA) mode, an electrically controlled birefringence (ECB) mode, or an in-plane switching (IPS) mode.

The top surface of the functional transparent plate may have a plurality of prisms consisting of first facets, on which a cholesteric liquid crystal layer does not exist, and second facets, on which a cholesteric liquid crystal exists. In this case, the first facets without the cholesteric liquid crystal material and the second facets with the cholesteric liquid crystal material are formed at the top surface of the functional transparent plate and may reflect light once, respectively. As a result, the reflected light is returned toward the first $\lambda/4$ retarder again.

The functional transparent plate may have a top and a bottom surface with an embossed carving or a depressed carving pattern. At this time, apexes formed in the patterns of the two surfaces may be formed to deviate from one another.

According to another aspect of the present invention, there is provided a display device including: a display panel assembly; a first $\lambda/4$ retarder that is provided on the display panel assembly; a reflective polarizer that is provided above the first $\lambda/4$ retarder to transmit incident light which is linearly polarized in a first direction and to reflect incident light which is linearly polarized in a second direction perpendicular to the first direction; a second λ/4 retarder that is provided on the reflective polarizer; a functional transparent plate that is provided on the second λ/4 retarder and which has a top surface with first facets and second facets where the second facets transmit only a component of incident light which is polarized in a specific direction and reflect the remaining components; a third λ/4 retarder that is provided under the display panel assembly; and a lower polarizer that is provided under the third λ/4 retarder.

The second facets that are formed at the top surface of the functional transparent plate may have a cholesteric liquid crystal layer thereon.

The display device may further include an upper polarizer that is provided between the first λ/4 retarder and the reflective polarizer.

The reflective polarizer may be a polarizer utilizing a dual brightness enhancement film (DBEF) that is produced based on reflectance anisotropy caused by refractive index anisotropy, or delicate linear patterns.

The display device may further include a backlight unit that is provided under the lower polarizer.

In this device, the functional transparent plate, the second λ/4 retarder, the reflective polarizer, the first λ/4 retarder, the display panel assembly, the third λ/4 retarder, and the lower polarizer may be bonded by an adhesive agent.

Spaces may be formed between the functional transparent plate and the second λ/4 retarder, due to a surface structure of either of a bottom surface of the functional transparent plate or a top surface of the second λ/4 retarder, and the spaces may be filled with a filling material with a refractive index that is equal to an average of refractive indices of the functional transparent plate and the second λ/4 retarder. As the filling material for the spaces, an organic silicon-based material such as silicon resin may be used.

The second facets which are formed at the top surface of the functional transparent plate may only transmit either of a right-handed circularly polarized component or a left-handed circularly polarized component of incident light, while reflecting the remaining components.

The top surface of the functional transparent plate may have a prismatic structure including the first facets, on which a cholesteric liquid crystal layer does not exist, and the second facets, on which a cholesteric liquid crystal exists. In this case, the first facet and the second facet may reflect light which is incident from the second λ/4 retarder once, respectively. As a result, the reflected light is returned toward the second λ/4 retarder again.

The functional transparent plate may have a top surface and a bottom surface with an embossed carving or a depressed carving pattern. In this structure, apexes formed in the patterns of the two surfaces may be formed to deviate from one another.

According to still another embodiment of the present invention, there is provided a display device including: a display panel assembly; a first λ/4 retarder that is provided on the display panel assembly; a reflective polarizer that is provided above the first λ/4 retarder to transmit incident light which is linearly polarized in a first direction and to reflect incident light which is linearly polarized in a second direction perpendicular to the first direction; a second λ/4 retarder that is provided on the reflective polarizer; and a functional transparent plate that is provided on the second λ/4 retarder and which has a top surface with first facets and second facets where the second facets transmit only a component of incident light which is polarized in a specific direction and reflect the remaining components.

The second facets which are formed at the top surface of the functional transparent plate may have a cholesteric liquid crystal layer thereon. In addition, the second facets which are formed at the top surface of the functional transparent plate may only transmit either of a right-handed circularly polarized component or a left-handed circularly polarized component of incident light, while reflecting the remaining components.

The top surface of the functional transparent plate may have a prismatic structure including the first facets, on which a cholesteric liquid crystal layer does not exist, and the second facets, on which a cholesteric liquid crystal exists.

The functional transparent plate may have a top surface and a bottom surface with an embossed carving or a depressed carving pattern. In this case, apexes formed in the patterns of the two surfaces may be formed to deviate from one another.

The first facets and the second facets which are formed at the top surface of the functional transparent plate may reflect light which is incident from the second λ/4 retarder once, respectively. As a result, the reflected light is returned toward the second λ/4 retarder again.

Between the functional transparent plate and the second λ/4 retarder, spaces may be formed due to a surface structure of either of a bottom surface of the functional transparent plate or a top surface of the second λ/4 retarder. In this case, the spaces may be filled with a filling material with a refractive index that is equal to an average of refractive indices of the functional transparent plate and the second λ/4 retarder. As the filling material for the spaces, an organic silicon-based material, such as silicon resin or the like, may be used.

According to still another embodiment of the present invention, there is provided a display device including: a display panel assembly; a selective reflection layer that is provided above the display panel assembly to transmit a component of incident exterior light which is circularly polarized in a first direction and to reflect a component of incident exterior light which is circularly polarized in a second direction perpendicular to the first direction; and a functional transparent plate that is provided on the selective reflection layer and which has a top surface including portions without a cholesteric liquid crystal material and portions with a cholesteric liquid crystal material.

The display device may further include a first polarizer that is provided between the selective reflection layer and the display panel assembly, a first λ/4 retarder that is provided between the first polarizer and the display panel assembly, a second λ/4 retarder that is provided between the selective reflection layer and the first polarizer, a second polarizer that is provided under the display panel assembly, a third λ/4 retarder that is provided between the second polarizer and the display panel assembly, and a backlight unit that is provided under the display panel assembly.

In this structure, the selective reflection layer may be formed of a cholesteric liquid crystal material.

In this device, the display panel, the selective reflection layer, and the functional transparent plate may be bonded using an adhesive agent.

Spaces may be formed between the functional transparent plate and the selective reflection layer, due to a surface structure of either of a bottom surface of the functional transparent plate or a top surface of the selective reflection layer, and the spaces may be filled with a filling material with a refractive index that is equal to an average of refractive indices of the functional transparent plate and the selective reflection layer. As the filling material for the spaces, an organic silicon-based material such as silicon resin may be used.

The display panel assembly includes an LC layer. LC molecules in the LC layer may be aligned in a 90°-twisted nematic (TN) mode, a vertical alignment (VA) mode, an electrically controlled birefringence (ECB) mode, or an in-plane switching (IPS) mode.

The top surface of the functional transparent plate may have a plurality of prisms consisting of first facets, on which a cholesteric liquid crystal layer does not exist, and second facets, on which a cholesteric liquid crystal exists. In this structure, the first facets and the second facets formed at the top surface of the functional transparent plate may reflect light which is incident from the selective reflection layer once, respectively. As a result, the reflected light is returned toward the selective reflection layer again.

The functional transparent plate may have a top surface and a bottom surface with an embossed carving or a depressed carving pattern. In this case, apexes formed in the patterns of the two surfaces may be formed to deviate from one another.

According to still another embodiment of the present invention, there is provided a display device including: a display panel assembly; a first λ/4 retarder that is provided on the display panel assembly; a first polarizer that is provided on the first λ/4 retarder where the first polarizer transmits external incident light which is linearly polarized in a first direction and that reflects external incident light which is linearly polarized in a second direction perpendicular to the first direction; a second λ/4 retarder that is provided on the first polarizer; a selective reflection layer that is provided on the second λ/4 retarder to transmit a component of incident light which is circularly polarized in a third direction and to reflect a component of incident light which is circularly polarized in a fourth direction that is perpendicular to the third direction; a functional transparent plate that is provided on the selective reflection layer and which has a top surface with first facets and second facets where the second facets transmit only a component of incident light which is polarized in a specific direction and reflect the remaining components; a third λ/4 retarder that is provided under the display panel assembly; and a second polarizer that is provided under the third λ/4 retarder.

In this structure, the second facets which are formed at the top surface of the functional transparent plate may have a cholesteric liquid crystal layer thereon, and the selective reflection layer may be formed of a cholesteric liquid crystal material.

The display device may further include a backlight unit that is provided under the second polarizer.

In this device, the functional transparent plate, the selective reflection layer, the second λ/4 retarder, the first polarizer, the first λ/4 retarder, the display panel assembly, the third λ/4 retarder, and the second polarizer may be bonded by an adhesive agent.

Between the functional transparent plate and the selective reflection layer, spaces may be formed due to a surface structure of either of a bottom surface of the functional transparent plate or a top surface of the selective reflection layer. These spaces may be filled with a filling material with a refractive index that is equal to an average of refractive indices of the functional transparent plate and the selective reflection layer. As the filling material for the spaces, an organic silicon-based material such as silicon resin may be used.

The second facets which are formed at the top surface of the functional transparent plate may only transmit either of a right-handed circularly polarized component or a left-handed circularly polarized component of incident light, while reflecting the remaining components.

The top surface of the functional transparent plate may have a prismatic structure including the first facets, on which a cholesteric liquid crystal layer does not exist, and the second facets, on which the cholesteric liquid crystal exists. In this case, the first facets and the second facets which are formed at the top surface of the functional transparent plate may reflect light which is incident from the selective reflection layer once, respectively. As a result, the reflected light is returned toward the selective reflection layer again.

The functional transparent plate may have a top surface and a bottom surface with an embossed carving or a depressed carving pattern. In this case, apexes formed in the patterns of the two surfaces may be formed to deviate from one another.

According to still another embodiment of the present invention, there is provided a display device including: a display panel assembly; a first λ/4 retarder that is provided on the display panel assembly; a first polarizer that is provided on the first λ/4 retarder where the first polarizer transmits light which is linearly polarized in a first direction and reflects light which is linearly polarized in a second direction perpendicular to the first direction; a second λ/4 retarder that is provided on the first polarizer; a selective reflection layer that is provided on the second λ/4 retarder to transmit light which is circularly polarized in a third direction and to reflect light which is circularly polarized in a fourth direction that is opposite to the third direction; and a functional transparent plate that is provided on the selective reflection layer and which has a top surface with first facets and second facets where the second facets transmit only light which is polarized in a specific direction and reflect the remaining light.

The second facets which are formed at the top surface of the functional transparent plate may have a cholesteric liquid crystal layer thereon, and may only transmit either of a right-handed circularly polarized component or a left-handed circularly polarized component of incident light and reflect the remaining components.

The top surface of the functional transparent plate may have a prismatic structure including the first facets, on which a cholesteric liquid crystal layer does not exist, and the second facets, on which a cholesteric liquid crystal exists. In this case, the first facets and the second facets which are formed at the top surface of the functional transparent plate may reflect light which is incident from the selective reflection layer once, respectively. As a result, the reflected light is returned toward the selective reflection layer again.

The functional transparent plate may have a top surface and a bottom surface with an embossed carving or a depressed carving pattern. In this case, apexes of the patterns of the two surfaces may be formed to deviate from one another.

Spaces may be formed between the functional transparent plate and the selective reflection layer, due to a surface structure of either of a bottom surface of the functional transparent plate or a top surface of the selective reflection layer. These spaces may be filled with a filling material with a refractive index that is equal to an average of refractive indices of the functional transparent plate and the selective reflection layer. As the filling material for the spaces, an organic silicon-based material such as silicon resin may be used.

BRIEF DESCRIPTION OF THE DRAWINGS

The above objects and other advantages of the present invention will become more apparent by describing the preferred embodiments thereof in more detail with reference to the accompanying drawings.

DETAILED DESCRIPTION OF THE PREFERRED EMBODIMENTS

Figure 1:
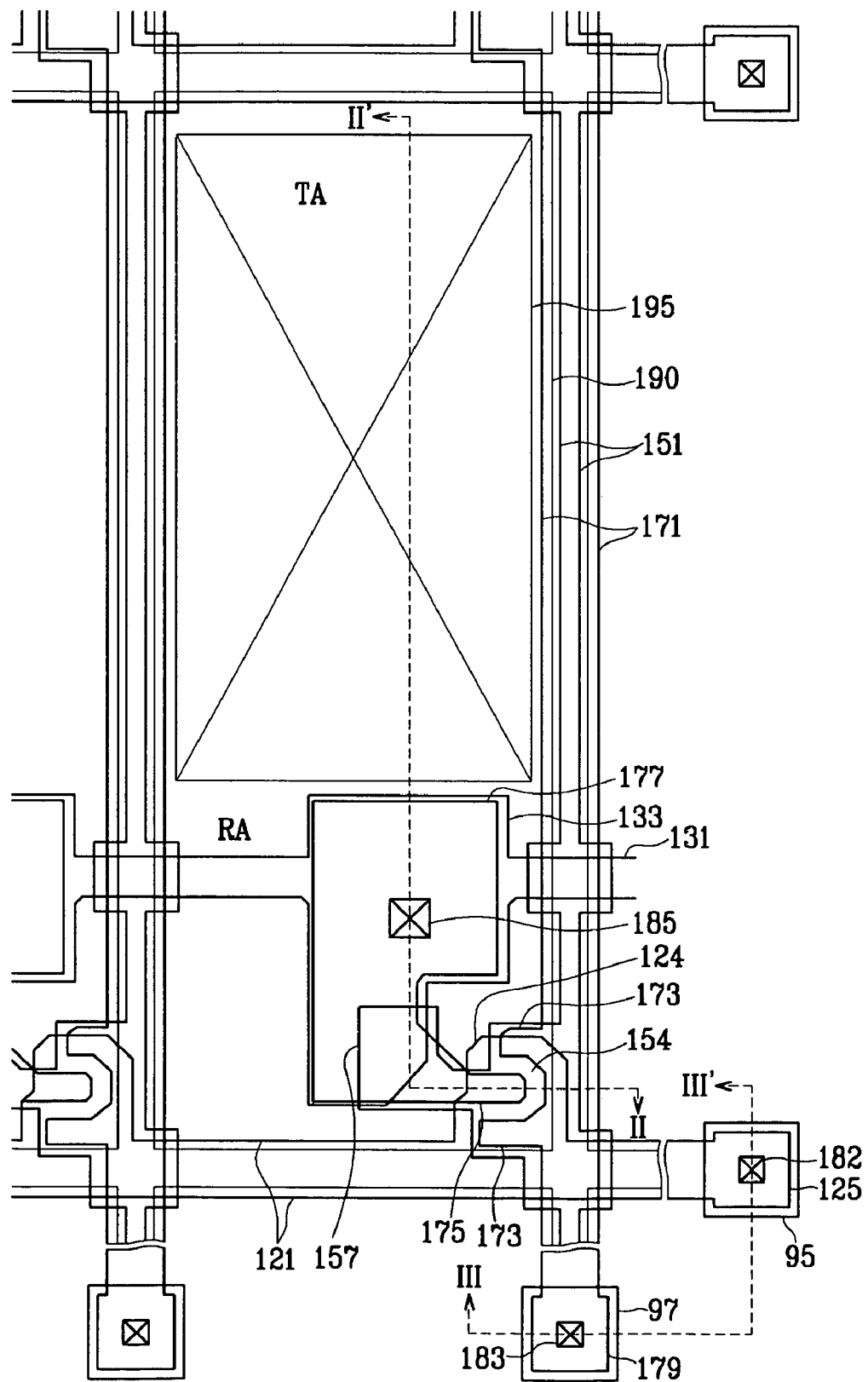
FIG. 1 is a layout view of an LCD according to an embodiment of the present invention.

Preferred embodiments of the present invention will now be described more fully hereinafter with reference to the accompanying drawings, in which preferred embodiments of the invention are shown. The present invention may, however, be embodied in different forms and should not be construed as being limited to the embodiments set forth herein. Rather, these embodiments are provided so that this disclosure will be thorough and complete, and will fully convey the scope of the invention to those skilled in the art.

In the drawings, the thickness of the layers, films, and regions are exaggerated for clarity. Like numerals refer to like elements throughout. It will be understood that when an element such as a layer, film, region, or substrate is referred to as being "on" another element, it can be directly on the other element or intervening elements may also be present.

Hereinafter, an LCD according to a preferred embodiment of the present invention will be described in detail with reference to FIG. 1 through FIG. 3.

Figure 2:
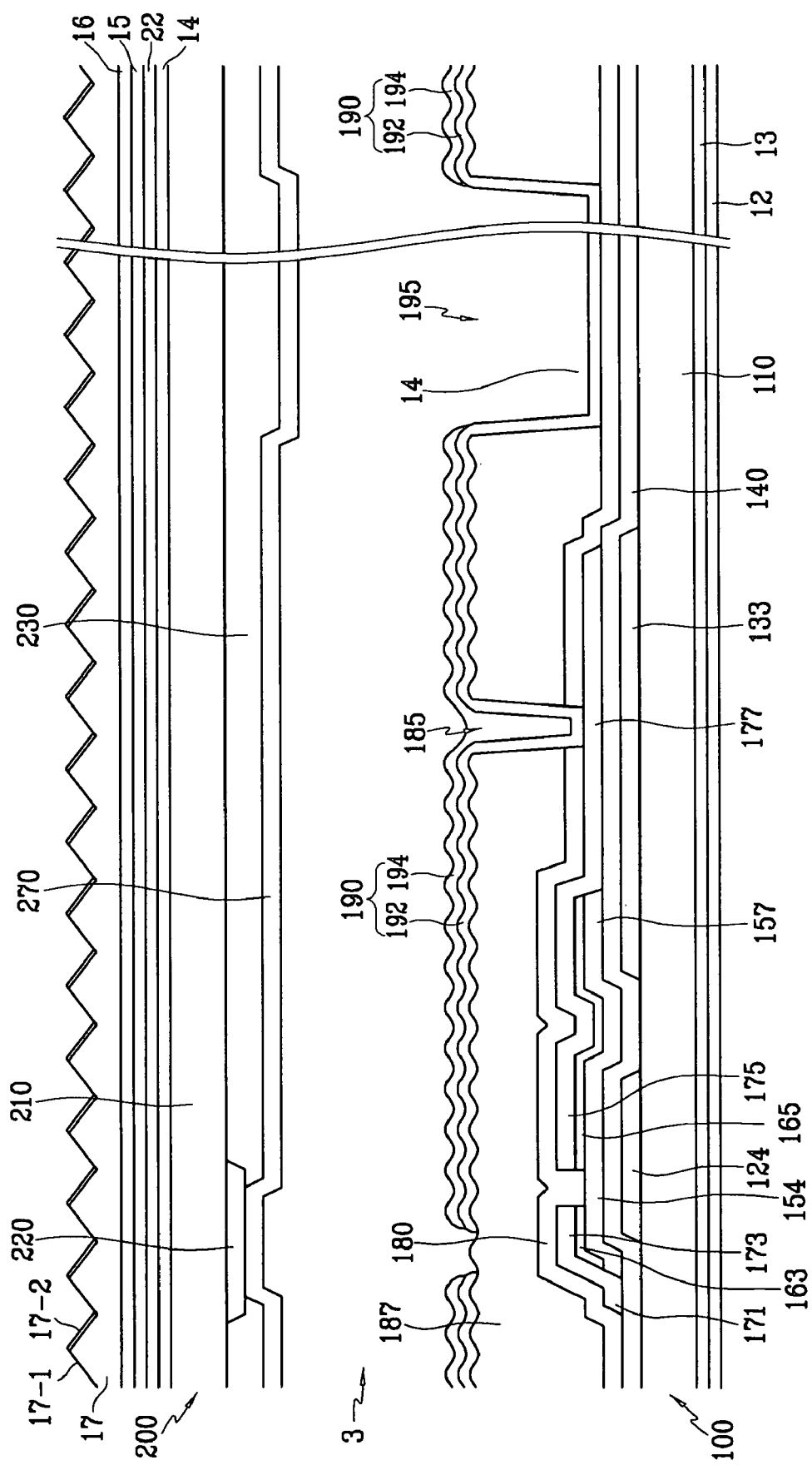
FIG. 2 is a schematic cross-sectional view cut along II-II' of FIG. 1.
Figure 3:
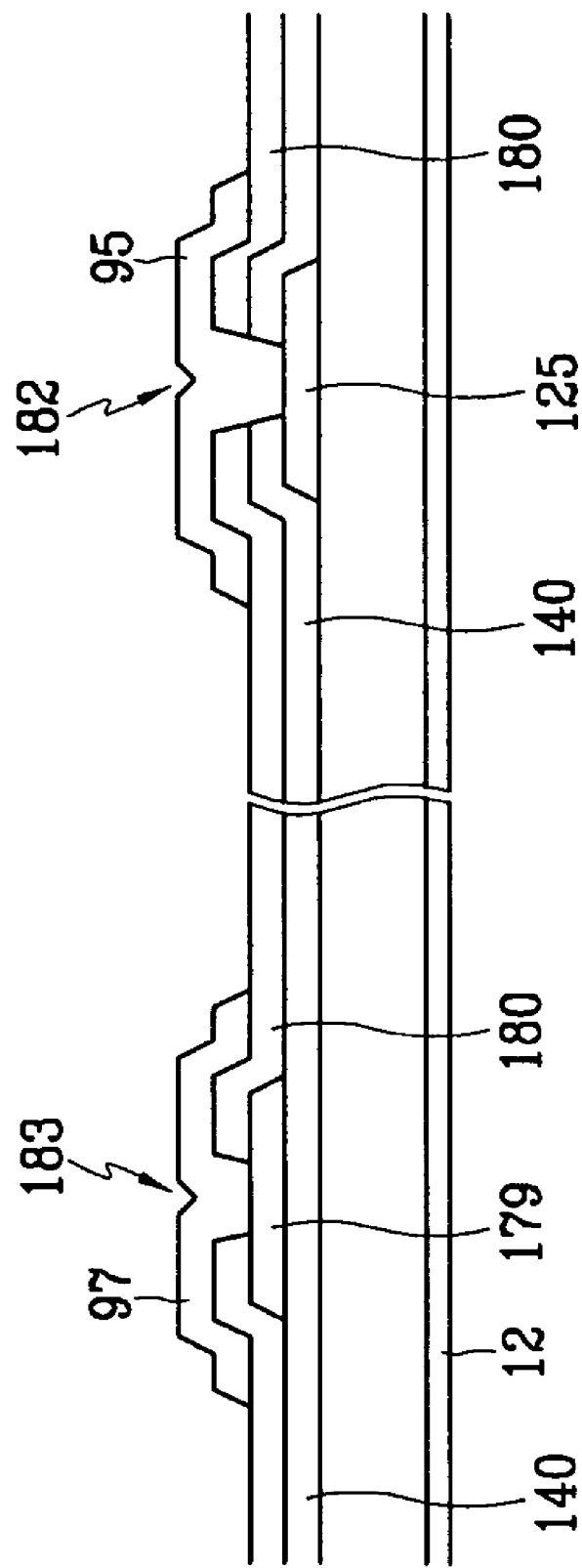
FIG. 3 is a schematic cross-sectional view cut along III-III' of FIG. 1.

FIG. 1 is a layout view of an LCD according to an embodiment of the present invention, and FIG. 2 and FIG. 3 are schematic cross-sectional views cut along II-II' and III-III' of FIG. 1, respectively.

Referring to FIG. 1 to FIG. 3, the LCD of this embodiment includes a TFT array panel 100 and a common electrode panel 200 facing each other, and an LC layer 3 that is interposed therebetween with LC molecules that are aligned perpendicular or parallel to the surfaces of the two panels 100 and 200.

LC molecules in the LC layer 3 are aligned in a 90°-twisted nematic (TN) mode, a vertical alignment (VA) mode, or an electrically controlled birefringence (ECB) mode.

The TFT array panel 100 is configured as follows.

A plurality of gate lines 121 and a plurality of storage electrode lines 131 are formed on an insulating substrate 110 made of transparent glass or plastic.

The gate lines 121 for transmitting gate signals extend substantially in a horizontal direction, while being separated from each other. Each gate line 121 includes a plurality of gate electrodes 124 protruding upward and an end portion 125 having a relatively large dimension to be connected to an external device.

The storage electrode lines 131 extend substantially in a horizontal direction and are substantially parallel to the gate lines 121. Each storage electrode line 131 includes a plurality of storage electrodes 133 protruding upward and downward. The storage electrode lines 131 receive a predetermined voltage, such as a common voltage that is applied to a common electrode 270 of the common electrode panel 200.

The gate lines 121 and the storage electrode lines 131 are preferably made of an aluminum (Al) containing metal such as Al and an Al alloy, a silver-(Ag) containing metal such as Ag and a Ag alloy, a copper-(Cu) containing metal such as Cu and a Cu alloy, a molybdenum-(Mo) containing metal such as Mo and a Mo alloy, chrome (Cr), titanium (Ti), or tantalum (Ta). The gate lines 121 and the storage electrode lines 131 may be configured as a multi-layered structure, in which at least two conductive layers (not shown) having different physical properties are included. In such a structure, an upper layer of the two is made of a low resistivity metal, such as an Al-containing metal, an Ag-containing metal, a Cu-containing metal, or the like, in order to reduce delay of the signals or a voltage drop in the gate lines 121 and the storage electrode lines 131, and a lower layer is made of material having prominent physical, chemical, and electrical contact properties with other materials such as indium tin oxide (ITO), indium zinc oxide (IZO), etc. For example, a Mo-containing metal, Cr, Ta, or Ti, etc., may be used for the formation of the same layer. A desirable example of the combination of the two layers is a lower Cr layer and an upper Al—Nd layer. However, the gate lines 121 and the storage electrode lines 131 may be configured as single-layered structures.

All lateral sides of the gate lines 121 and the storage electrode lines 131 preferably slope in a range from about 20° to 80° to the surface of the substrate 110.

A gate insulating layer 140 made of silicon nitride ($SiN_x$) or silicon oxide ($SiO_2$) is formed on the gate lines 121 and the storage electrode lines 131.

A plurality of linear semiconductors 151 made of hydrogenated amorphous silicon (abbreviated as "a-Si") or polysilicon are formed on the gate insulating layer 140. Each linear semiconductor 151 extends substantially in a vertical direction and includes a plurality of projections 154 that extend along the respective gate electrodes 124 and a plurality of extensions 157 that extend from the respective projections 154. The linear semiconductors 151 are enlarged in the vicinities of the gate lines 121 and the storage electrode lines 131 to cover them entirely.

A plurality of linear ohmic contacts 161 and island-shaped ohmic contacts 165 are formed on the linear semiconductors 151. The ohmic contacts 161 and 165 may be made of N+ hydrogenated amorphous silicon that is highly doped with N-type impurities, or silicide. The linear ohmic contacts 161 include a plurality of projections 163. A set of a projection 163 and an island-shaped ohmic contact 165 is placed on the projection 154 of the semiconductor 151.

All lateral sides of the semiconductors 151 and the ohmic contacts 161 and 165 slope in the range from about 20° to 80° to the surface of the substrate 110.

A plurality of data lines 171 and a plurality of drain electrodes 175, separated from the data lines 171, are formed on the ohmic contacts 161 and 165 and the gate insulating layer 140.

The data lines 171 for transmitting data signals extend substantially in a vertical direction to be crossed with the gate lines 121 and the storage electrode lines 131. Each data line 171 includes an end portion 179 having a relatively large dimension to be connected to a different layer or an external device.

Each drain electrode 175 includes an expansion 177 that is overlapped with one of the storage electrodes 133. Each data line 171 further includes a plurality of source electrodes 173 protruding along and extending toward the respective gate electrodes 124. Each source electrode 173 surrounds a partial portion of a bar-shaped end portion of the drain electrode 175.

A gate electrode 124, a source electrode 173, a drain electrode 175, and a projection 154 of the semiconductor 151 form a thin film transistor (TFT). A TFT channel is formed in the projection 154 provided between the source electrode 173 and the drain electrode 175.

The data lines 171 and the drain electrodes 175 are preferably made of a refractory metal, such as a Mo-containing metal, a Cr-containing metal, Ta, Ti, or the like, and may be configured as multi-layered structures including a lower layer (not shown) consisting of one among Mo, a Mo alloy, Cr, etc., and an upper layer (not shown) consisting of an Al-containing metal.

Similarly to the gate lines 121 and the storage electrode lines 131, all lateral sides of the data lines 171 and the drain electrodes 175 slope in the range from about 20° to 80° to the surface of the substrate 110.

The ohmic contacts 161 and 165 exist only between the underlying semiconductors 151 and the overlying data lines 171 and between the overlying drain electrodes 175 and the underlying semiconductors 151, in order to reduce contact resistance therebetween. The linear semiconductors 151 are partially exposed at places where the data lines 171 and the drain electrodes 175 do not cover them, as well as between the source electrodes 173 and the drain electrodes 175.

A passivation layer 180, made of an inorganic material such as $SiN_x$ or $SiO_2$, is formed on the data lines 171, the drain electrodes 175, and the exposed portions of the semiconductors 151.

An organic insulating layer 187, made of a photosensitive organic insulator having a prominent planarization property, is formed on the passivation layer 180. A top surface of the organic insulating layer 187 is uneven. Due to the uneven surface, reflective electrodes 194 overlying the organic insulating layer 187 have uneven top surfaces. The uneven top surfaces of the reflective electrodes 194 prevent mirror reflection. Accordingly, images that may be shown on an LCD screen due to the mirror reflection are eliminated. The organic insulating layer 187 is removed at the end portions 125 and 179 of the gate lines 121 and the data lines 171, so only the passivation layer 180 remains on the end portions 125 and 179.

The passivation layer 180 is provided with a plurality of contact holes 183, through which the end portions 179 of the data lines 171 are exposed. A plurality of contact holes 182 are formed in the passivation layer 180 and the gate insulating layer 140, and the end portions 125 of the gate lines 121 are exposed therethrough. A plurality of contact holes 185 are formed in the passivation layer 180 and the organic insulating layer 187, and the expansions 177 of the drain electrodes 175 are exposed therethrough. The contact holes 182, 183, and 185 may have polygonal or circular shapes. The sidewalls of the contact holes 182, 183, and 185 slope in the range from about 30° to 85° to the surface of the substrate 110 or are shaped as steps.

A plurality of pixel electrodes 190 are formed on the organic insulating layer 187.

Each pixel electrode 190 includes a transparent electrode 192 and a reflective electrode 194 overlying the transparent electrode 192. The transparent electrodes 192 are made of a transparent conductive material such as ITO or IZO, and the reflective electrodes 194 are made of a reflective opaque material such as Al, an Al alloy, Ag, or an Ag alloy. Each pixel electrode 190 may further include a contact assistant (not shown) made of Mo, a Mo alloy, Cr, Ti, or Ta. The contact assistants ensure contact properties between the transparent electrodes 192 and the reflective electrodes 194, while preventing the transparent electrodes 192 from oxidizing the reflective electrodes 194.

Each pixel is divided into a transmission area TA without the reflective electrode 194 and a reflection area RA with the reflective electrode 194. The organic insulating layer 187 is removed from the transmission area TA, so that a transmission window 195 is formed there. Due to the transmission window 195, a cell gap of the transmission area TA becomes nearly twice as large as that of the reflection area RA, so that a light path difference between the transmission area TA and the reflection area RA is compensated.

The pixel electrodes 190 are physically and electrically connected to the expansions 177 of the drain electrodes 175 through the contact holes 185 to receive data voltages from the drain electrodes 175. The pixel electrodes 190 are supplied with the data voltages to generate electric fields in cooperation with the common electrode 270 of the common electrode panel 200, determining the molecular orientation of the LC layer 3 interposed between the two electrodes.

Each set of the pixel electrode 190 and the common electrode 270 forms an LC capacitor that is capable of storing the applied voltage after the TFT is turned off. To enhance the voltage storage ability of the LC capacitors, storage capacitors, connected to the LC capacitors in parallel, are further provided. Overlapping of the expansions 177 of the drain electrodes 175 with the storage electrodes 133 implements the storage capacitors. Otherwise, overlapping of the pixel electrodes 190 with the gate lines 121 adjacent thereto may implement the storage capacitors. In this case, the storage electrode lines 131 may be omitted.

The pixel electrodes 190 may be overlapped with the data lines 171 adjacent thereto as well as the gate lines 121 adjacent thereto, in order to increase the aperture ratio, but such overlap portions are not always necessary.

The pixel electrodes 190 may be made of a transparent conductive polymer. However, opaque reflective metals may be used in reflective LCDs.

A plurality of contact assistants 95 and 97 are formed on the passivation layer 180 relating to a pad portion, and are individually connected to the end portions 125 of the gate lines 121 and the end portions 179 of the data lines 171 through the contact holes 182 and 183. The contact assistants 95 and 97 supplement adhesion between the end portions 125 and 179 and exterior devices, and protect them. The contact assistants 95 and 97 may be formed on the same layer as the transparent electrodes 192 or the reflective electrodes 194. However, they may be omitted because they are not essential elements.

The common electrode panel 200 facing the TFT array panel 100 is configured as follows.

A light-blocking member 220 called a "black matrix" is provided on an insulating substrate 210 made of a transparent insulating material such as glass. The light-blocking member 220 prevents light from leaking out through barriers between the pixel electrodes 190 and delimits aperture regions facing the pixel electrodes 190.

A plurality of color filters 230 are formed on the substrate 210 and the light-blocking member 220, and most of them are placed within the aperture regions delimited by the light-blocking member 220. Each color filter 230 is formed between the two adjacent data lines 171 in a vertical direction, and exhibits one among red, green, and blue colors. The color filters 230 are connected to one another in the form of stripes.

In the case of a typical transflective LCD, in the transmission areas TA, light passes through the color filters 230 only once, while it passes twice in the reflection areas RA. Accordingly, a difference of color tone between the transmission areas TA and the reflection areas RA is generated. To reduce the difference of color tone between the two areas TA and RA, two methods can be used. The first method is to form the thickness of each color filter 230 differently depending on its location. That is, in this method, a specific portion of the color filter 230, which is placed at the transmission area TA, is formed thicker than the remaining portion, which is placed at the reflection area RA. The second method is to form light holes in the reflection areas RA of the color filters 230.

The common electrode 270, made of a transparent conductive material such as ITO or IZO, is formed on the light-blocking member 220 and the color filters 230.

The LC layer 3 is interposed between the two panels 100 and 200 facing each other.

A lower polarizer 12 and an upper polarizer 22 are individually attached to the outer surfaces of the two panels 100 and 200. A transmission axis (θ) of the upper polarizer 22 and a transmission axis (θ+90°) of the lower polarizer 12 are mutually crossed at a right angle.

A lower λ/4 retarder 13 is interposed between the TFT array panel 100 and the lower polarizer 12, and a first upper λ/4 retarder 14 is interposed between the common electrode panel 200 and the upper polarizer 22.

A reflective polarizer 15 is disposed on the upper polarizer 22, and a second upper λ/4 retarder 16 is disposed on the reflective polarizer 15.

A functional transparent plate 17 is disposed on the second upper λ/4 retarder 16. A top surface of the functional transparent plate 17 consists of a plurality of prisms. Each prism includes a first facet 17-1 on which no additional material exists and a second facet 17-2 on which a cholesteric LC layer exists.

Hereinafter, the structure of the above-mentioned LCD and the polarization principles of light in the same LCD will be described in detail.

Figure 4:
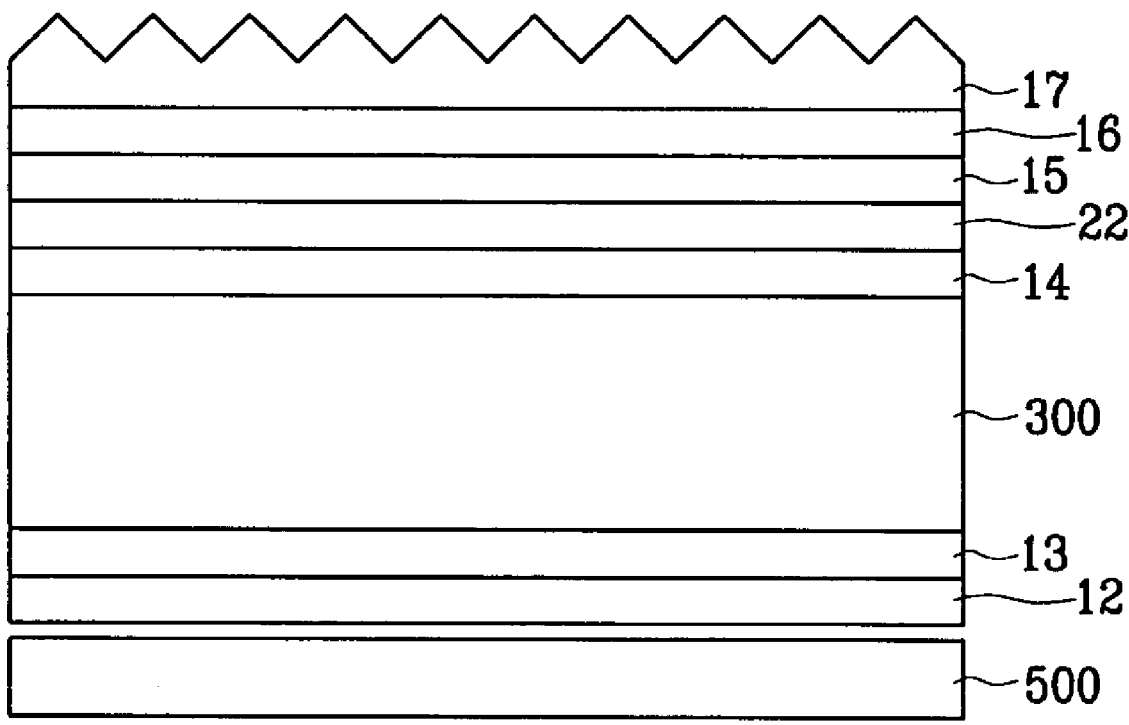
FIG. 4 shows a vertical scheme of the LCD according to an embodiment of the present invention.

FIG. 4 shows a vertical scheme of the LCD of an embodiment of the present invention.

A display panel assembly 300 of FIG. 4 comprises the TFT array panel 100 and the common electrode panel 200, and the LC layer 3 interposed therebetween.

The lower λ/4 retarder 13 is attached to a lower surface of the display panel assembly 300, and the lower polarizer 12 is attached to a lower surface of the lower λ/4 retarder 13.

Meanwhile, the first upper λ/4 retarder 14 is attached to an upper surface of the display panel assembly 300, and the upper polarizer 22 is attached to an upper surface of the first upper λ/4 retarder 14. The reflective polarizer 15 is attached to an upper surface of the upper polarizer 22 and the second upper λ/4 retarder 16 is attached onto the reflective polarizer 15. The functional transparent plate 17, whose top surface consists of a plurality of combinations of the first facet 17-1 and second facet 17-2, is formed on the second upper λ/4 retarder 16.

A more detailed description for the above-discussed structure is given below.

The polarizers 12 and 22 are individually attached to the outer surfaces of the panels 100 and 200. Their transmission axes are mutually crossed at a right angle. The two polarizers 12 and 22 are absorption-type polarizers that transmit linearly polarized incident light vibrating parallel to their transmission axes and absorb linearly polarized incident light vibrating perpendicular to their transmission axes.

The LCD of this embodiment utilizes three λ/4 retarders in total. Each of the three λ/4 retarders 13, 14, and 16 converts circularly polarized light into linearly polarized light or linearly polarized light into circularly polarized light by causing a phase difference of a quarter wavelength between two polarized components that are orthogonal to each other and are individually parallel to a fast axis and a slow axis thereof. Here, the circularly polarized light may be elliptically polarized light in actuality, but the elliptically polarized light will also be referred to as circularly polarized light for convenience.

The fast axes of the three λ/4 retarders 13, 14, and 16 are preferably formed at ±45° to the transmission axes (θ and θ+90°) of the polarizers 12 and 22 to maximize the phase difference between the two polarized components. However, they may be disposed at different angles, except being disposed perpendicular or parallel to each other.

The reflective polarizer 15 is disposed on the upper polarizer 22. A transmission axis and a reflection axis of the reflective polarizer 15 are mutually perpendicular. Accordingly, the reflective polarizer 15 transmits linearly polarized incident light that vibrates parallel to the transmission axis, while reflects linearly polarized incident light that vibrates parallel to the reflection axis. The reflective polarizer 15 is formed of a dual brightness enhancement film (DBEF), as disclosed in U.S. Pat. No. 5,825,543, utilizing the reflectance anisotropy caused by the refractive index anisotropy. Otherwise, the reflective polarizer 15 may utilize delicate linear patterns disclosed by Japanese Patent Publication No. 1990-308166. The transmission axes of the reflective polarizer 15 and the upper polarizer 22 are disposed in the same direction.

The functional transparent plate 17 is made of a transparent material and has a prismatic top surface consisting of a plurality of first facets 17-1 and a plurality of second facets 17-2, as shown in FIG. 4. No additional material exists on the first facets 17-1, while the cholesteric LC layer exists on the second facets 17-2. The second facets 17-2 transmit circularly polarized incident light rotating in the same direction as an optical axis of the cholesteric LC layer, while reflecting circularly polarized incident light rotating in an opposite direction. A fabrication method of the first facets 17-1 and the second facets 17-2 will be described later.

The functional transparent plate 17, the second upper λ/4 retarder 16, the reflective polarizer 15, the upper polarizer 22, the first upper λ/4 retarder 14, the display panel assembly 300, the lower λ/4 retarder 13, and the lower polarizer 12 are bonded by an adhesive agent in that order.

Figure 5:
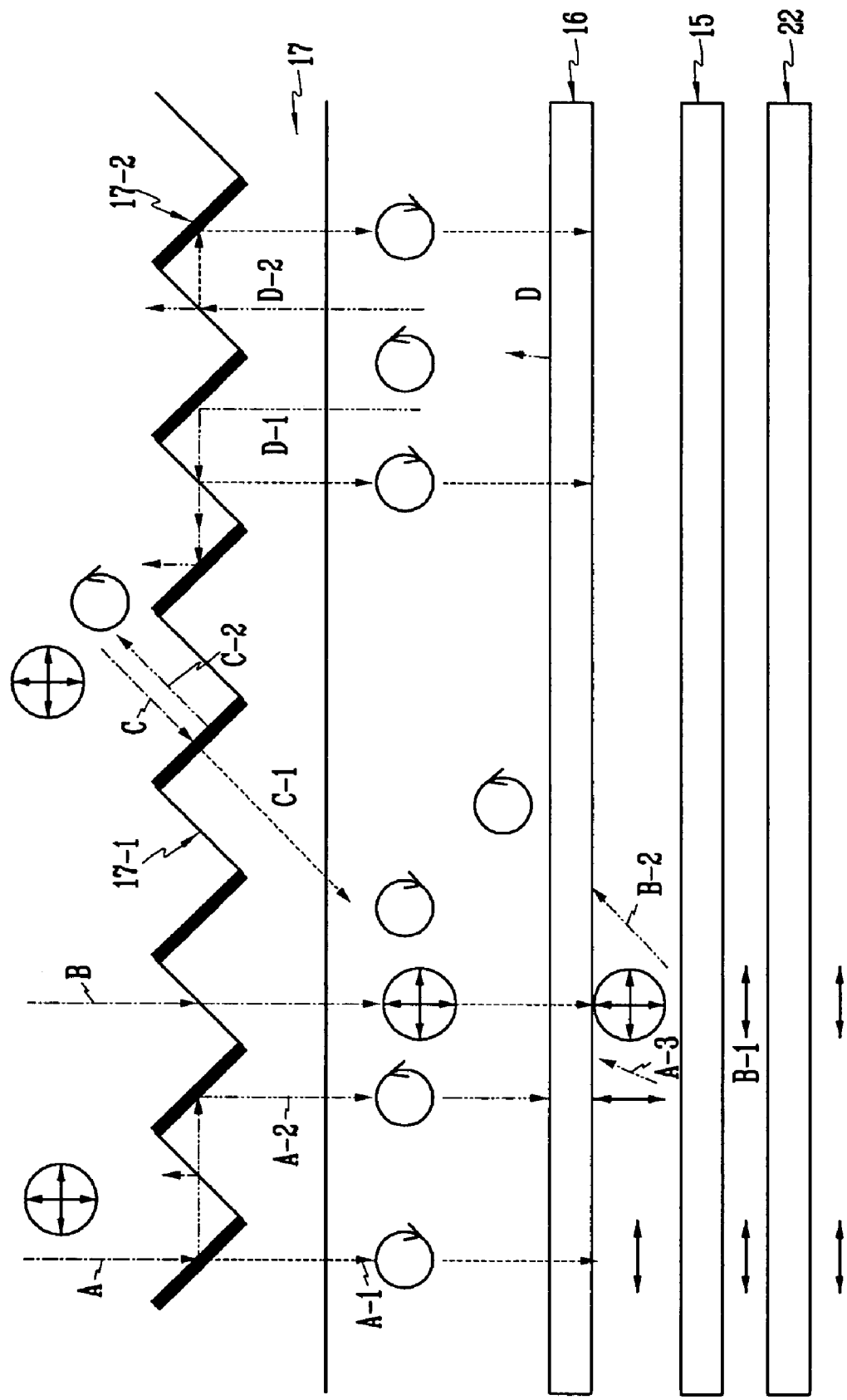
FIG. 5 shows variations of the polarization state of light at an upper portion of an LCD according to an embodiment of the present invention.

FIG. 5 shows variations of the polarization state of light at an upper part of the LCD with the functional transparent plate 17, the second upper λ/4 retarder 16, the reflective polarizer 15, and the upper polarizer 22.

As shown in FIG. 5, light, which is incident onto the functional transparent plate 17, is classified into three light rays (A, B, and C) depending on incident position and incident angle.

First, incident light (A) of the three light rays is described.

The light (A), which is incident onto the second facets 17-2 of the functional transparent plate 17, is separated into two individual light rays (A-1) and (A-2) having different light paths from each other. That is, when the light (A) impacts the second facets 17-2 where the cholesteric LC layer is formed, only right-handed circularly polarized light (A-1) of the incident light (A), which rotates in the same direction as the optical axis of the cholesteric LC layer, passes through the functional transparent plate 17, while left-handed circularly polarized light (A-2), which rotates in the opposite direction, is reflected.

The light (A-1) passing through the transparent plate 17 then travels through the second upper λ/4 retarder 16. At this time, the light (A-1) is converted into light that is linearly polarized in the X direction. Next, the linearly polarized light (A-1) sequentially passes through the reflective polarizer 15 and the upper polarizer 22. In this structure, the transmission axis of the upper polarizer 22 is in the X-direction, while the reflection axis of the reflective polarizer 15 is in the Y-direction.

Meanwhile, the left-handed circularly polarized reflected light (A-2) passes through the first facets 17-1 and is then reflected again by an adjacent second facet 17-2. The polarization state of the light (A-2) is maintained with no change during these sequential processes. This is possible because the second facets 17-2 that are formed with the cholesteric LC do not cause any change in the polarization state of the light when reflecting it. Next, the left-handed circularly polarized light (A-2) enters the second upper λ/4 retarder 16. At this time, the second upper λ/4 retarder 16 converts the incident light (A-2) into linearly polarized light in the Y direction. Then, the linearly polarized light (A-2) is returned back by the reflective polarizer 15 because the reflection axis of the reflective polarizer 15 and the polarized direction of the light (A-2) are in the same direction. The light that is reflected by the reflective polarizer 15 is designated as (A-3) in FIG. 5.

Incident light (B) of FIG. 5 is described below.

The light (B), which is incident onto the first facets 17-1 of the functional transparent plate 17, passes though the functional transparent plate 17 and the second upper λ/4 retarder 16. Even after passing through the second upper λ/4 retarder 16, the light (B) includes all-directional components without a change. In other words, the second upper λ/4 retarder 16 transmits all components of the incident light (B). Next, the light (B) enters the reflective polarizer 15, which allows only those components of the light that are parallel to its transmission axis (i.e., the X direction) to pass and reflects the components perpendicular to the transmission axis. Accordingly, the light (B) is divided into two separate light rays (B-1) and (B-2) by the reflective polarizer 15.

Meanwhile, light (C), which is perpendicularly incident to the second facets 17-2 of the functional transparent plate 17, is also divided into two separate light rays (C-1) and (C-2) having different light paths. That is, a right-handed circularly polarized component (C-1) of the incident light (C), which rotates in the same direction as the optical axis of the cholesteric LC layer, passes through the functional transparent plate 17 and then proceeds along the same light path as the light (A-1), while a left-handed circularly polarized component (C-2) of the incident light (C), which rotates in the opposite direction, exits the LCD by reflection at the second facets 17-2. Here, plane angles of the first facets 17-1 and the second facets 17-2 may be controlled so that the left-handed circularly polarized reflected light (C-2) is incident onto the first facets 17-1 again and then enters the second upper λ/4 retarder 16 after being reflected or refracted by the functional transparent plate 17.

In the meantime, the linearly polarized light rays (A-3) and (B-2), which are reflected by the reflective polarizer 15, enter the second upper λ/4 retarder 16 again. At this time, the second upper λ/4 retarder 16 converts the incident light (A-3) and (B-2) into left-handed circularly polarized light (D). The left-handed circularly polarized light (D) is divided into two light rays (D-1) and (D-2) depending on incident positions of the light (D). That is, the light (D-1) is incident onto the first facets 17-1 of the functional transparent plate 17, while the light D-2 is incident onto the second facets 17-2. The two light rays (D-1) and (D-2) are doubly reflected by the first facets 17-1 and the second facets 17-2, respectively. At this time, the light rays (D-1) and (D-2) undergo 180° phase changes with the reflection at the first facets 17-1, so that they are all converted into right-handed polarized light rays. Next, the right-handed polarized light rays (D-1) and (D-2) enter the second upper λ/4 retarder 16 again, and the second upper λ/4 retarder 16 transmits the incident light rays (D-1) and (D-2), converting them into linearly polarized light rays in the X direction, in a similar manner to the light (A-1).

As described above, the light, which is incident from the ambient environment through the first facets 17-1 and the second facets 17-2 of the functional transparent plate 17, does not exit the LCD after being reflected by the reflective polarizer 15 and is returned to the reflection polarizer 15 again by changing its polarization direction, so that display luminance of the LCD in a reflection mode is improved. To accomplish this effect, it is preferable to design the functional transparent plate 17 so that the first facets 17-1 and the second facets 17-2 thereof represent the largest possible refractive index difference, while having the largest possible dimensions. It is also preferable to form angles between the two facets 17-1 and 17-2 to be large and as far as possible. In the case that the difference between the refractive indices of the exterior air and the functional transparent plate 17 is large, no total reflection occurs when exterior light enters the functional transparent plate 17, but a total reflection occurs when the light is emitted from the functional transparent plate 17. Accordingly, utilization efficiency for the exterior light is improved.

Figure 6:
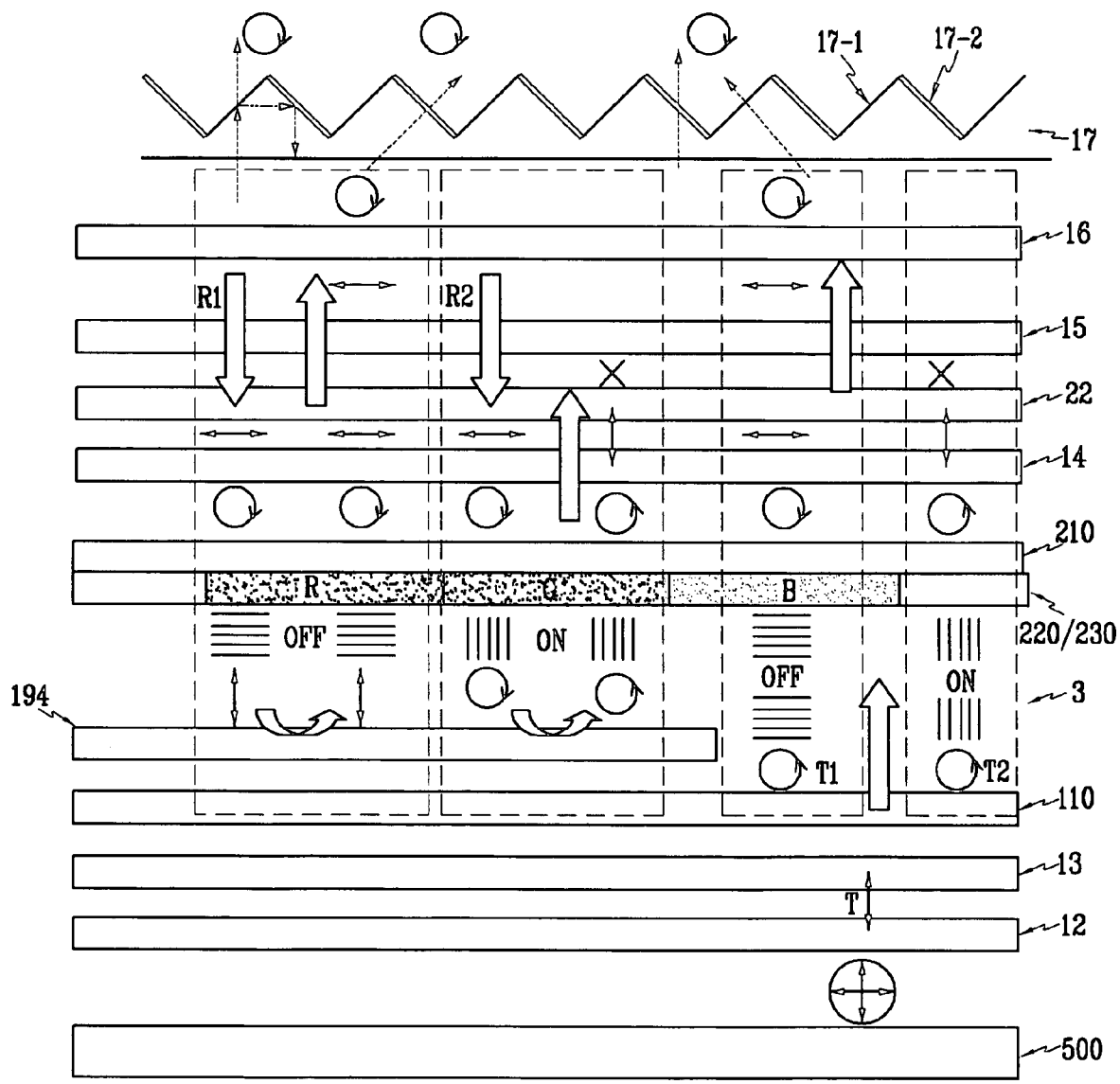
FIG. 6 is a view for comparing the polarization states of light when an LCD operates in a reflection mode utilizing exterior light and in a transmission mode utilizing internal light.

FIG. 6 is a view for comparing the polarization states of light when the LCD operates in a reflection mode utilizing exterior light and in a transmission mode utilizing internal light.

In this embodiment, the LC layer 3 consists of twisted nematic LC molecules. The twisted nematic LC molecules have peculiar optical properties. In detail, they are aligned in a vertical direction when an electric field is applied, thereby causing no change in the polarization state of light passing through the LC layer 3, but they are alighted in a horizontal direction when no electric field is applied, thereby changing the polarization state of light passing through the LC layer 3.

Hereinafter, variations of the polarization states of light when no electric field is applied to the LC layer 3 will be first described with reference to FIG. 6.

In FIG. 6, leftmost light (R1) is incident light from the ambient environment when no electric field is applied to the LC layer 3 in a reflection mode. The light (R1) successively passes through the reflective polarizer 15 and the upper polarizer 22 as linearly polarized light in the X direction. The linearly polarized light (R1) then enters the first upper λ/4 retarder 14. At this time, the first upper λ/4 retarder 14 converts the incident light into right-handed circularly polarized light. The right-handed circularly polarized light (R1) enters the LC layer 3 after passing through the upper insulating substrate 210 and the color filters 230. In this case, since the LC layer 3 is supplied with no electric field, the light is converted into linearly polarized light in the Y direction. The linearly polarized light (R1) rotates by 180° with the reflection at the reflective polarizer 15. However, the light (R1) maintains the polarization state without a change even after rotation. The reflected light (R1) is converted into right-handed circularly polarized light again when passing through the LC layer 3, and then enters the first upper λ/4 retarder 14 after passing through the color filters 230 and the upper insulating substrate 210. At this time, the first upper λ/4 retarder 14 converts the right-handed circularly polarized light (R1) into linearly polarized light in the X direction. Next, the linearly polarized light (R1) enters the second upper λ/4 retarder 16 after passing through the upper polarizer 22 and the reflective polarizer 15. At this time, the linearly polarized light (R1) is converted into right-handed circularly polarized light by the second upper λ/4 retarder 16 and then exits the LCD after passing through the functional transparent plate 17. At this time, the LCD screen is shown as a white state.

Meanwhile, light is supplied from an internal light source, i.e., a backlight unit 500. The light passes through the lower polarizer 12. In this step, only a linearly polarized component of the light (T) in the Y direction remains and the remaining components are removed by absorption. The linearly polarized component (T) is converted into left-handed circularly polarized light (T1, T2) by the lower λ/4 retarder 13. Light (T1) is light supplied from the internal light source when no electric field is applied to the LC layer 3 in a transmission mode The left-handed circularly polarized light (T1) enters the LC layer 3 after passing through the lower insulating substrate 110, and is converted into right-handed circularly polarized light when passing through the LC layer 3. The right-handed circularly polarized light (T1) passes through the upper insulating substrate 210 and then enters the first upper λ/4 retarder 14. At this time, the light (T1) is converted into linearly polarized light in the X direction by the first upper λ/4 retarder 14. Next, the linearly polarized light (T1) successively passes through the upper polarizer 22 and the reflective polarizer 15. Then, the light (T1) passing though the two polarizers passes thought the second upper λ/4 retarder 16, thereby being converted into right-handed circularly polarized light. The right-handed circularly polarized light (T1) then exits the LCD. At this time, the LCD screen is shown as a white state.

Hereinafter, variations of the polarization states in the case of the field-applied LC layer 3 will be discussed with reference to FIG. 6.

In FIG. 6, light (R2) is incident light from the ambient environment when an electric field is applied to the LC layer 3 in a reflection mode. The light (R2) successively passes through the reflective polarizer 15 and the upper polarizer 22 as linearly polarized light in the X direction. The linearly polarized light (R2) then enters the first upper λ/4 retarder 14. At this time, the first upper λ/4 retarder 14 converts the incident light (R2) into right-handed circularly polarized light. Next, the right-handed circularly polarized light (R2) enters the LC layer 3 after passing through the upper insulating substrate 210 and the color filters 230. In this case, the field-applied LC layer 3 does not cause a change in the polarization state of the light passing therethrough. Sequentially, the right-handed circularly polarized light (R2) rotates by 180° with the reflection at the reflective electrodes 194, thereby being converted into left-handed circularly polarized light. The left-handed circularly polarized light (R2), reflected by the reflective electrodes 194, passes through the LC layer 3 again without a change of the polarization state, and then enters the first upper λ/4 retarder 14 after passing through the color filters 230 and the upper insulating substrate 210. At this time, the first upper λ/4 retarder 14 converts the incident left-handed circularly polarized light (R2) into linearly polarized light in the Y direction. Next, the upper polarizer 22 completely absorbs linearly polarized light in the Y direction, so that no light exits the LCD. In this case, the LCD screen is shown as a black state.

Meanwhile, light (T2) of FIG. 6 is light supplied from the backlight unit 500 when an electric field is applied to the LC layer 3 in a transmission mode. The light supplied from the backlight unit 500 passes through the lower polarizer 13. In this step, only a linearly polarized component (T) in the Y direction of the light remains and the remaining components are removed by absorption. The linearly polarized component in the Y direction is converted into left-handed circularly polarized light by the lower λ/4 retarder 13. The left-handed circularly polarized light (T2) enters the LC layer 3 after passing through the lower insulating substrate 110, and then exits the LC layer 3 with no change of the polarization state. Next, the left-handed circularly polarized light (T2) passes through the color filters 230 and the upper insulating substrate 210, and then enters the first upper λ/4 retarder 14. At this time, the light (T2) is converted into linearly polarized light in the Y direction by the first upper λ/4 retarder 14. Next, the upper polarizer 22 completely absorbs the linearly polarized light (T2), so that no light exits the LCD. In this case, the LCD screen is shown as a black state.

As described above, regardless of the operation modes of the LCD, the LCD screen exhibits the black state when the field is applied to the LC layer 3, while exhibiting the white state when the field is not applied to the LC layer 3.

FIG. 7 through FIG. 12 are schematic cross-sectional views showing process steps to manufacture a functional transparent plate 17 of an LCD according to a preferred embodiment of the present invention.

The functional transparent plate 17 is manufactured as follows.

Figure 7:
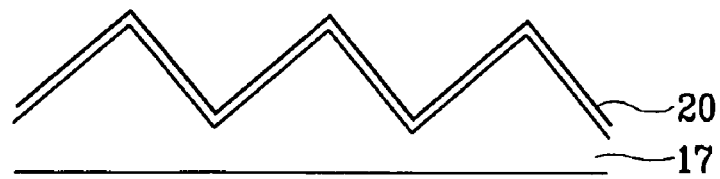
FIG. 7 through FIG. 12 are schematic cross-sectional views showing process steps to manufacture a functional transparent plate of an LCD according to an embodiment of the present invention.
Figure 8:
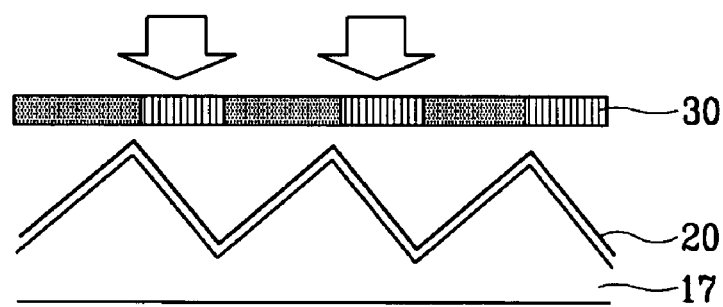
Figure 9:
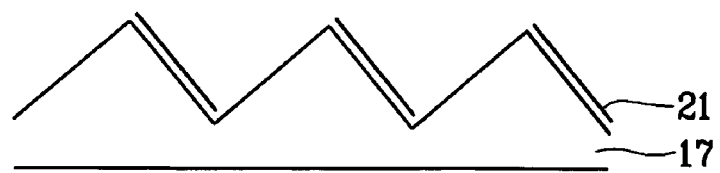
Figure 10:
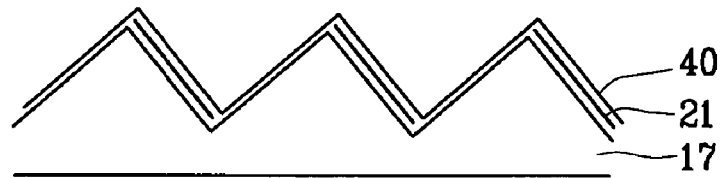
Figure 11:
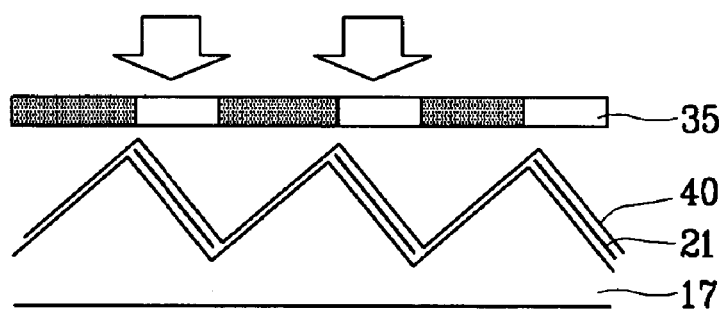
Figure 12:
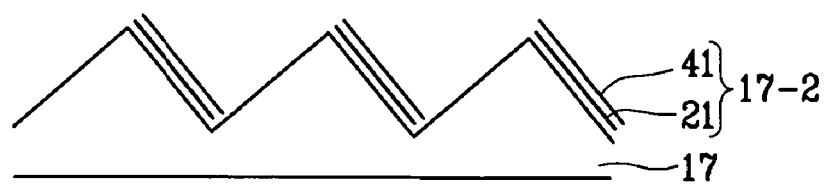

As shown in FIG. 7, the functional transparent plate 17 with a prismatic top surface, which consists of first facets 17-1 and second facets 17-2, is first formed, and then an optical alignment agent 20 is coated thereon. The resultant structure of FIG. 7 is then selectively exposed to light through a first mask 30 as shown in FIG. 8. After exposure, as shown in FIG. 9, a development process is performed so that an optical alignment layer 21 remains only on the first facets 17-1. Subsequent to the development, a cholesteric LC material 40 is coated on the functional transparent plate 17, as shown in FIG. 10. Next, the resultant structure of FIG. 10 is selectively exposed to light through a second mask 35 as shown in FIG. 11. Then, as shown in FIG. 12, a development process and a UV curing process are successively performed, so that a cholesteric LC layer 41 is formed only on the second facets 17-2. As a result, each second facet 17-2 consists of the optical alignment layer 21 and the cholesteric LC layer 41.

Figure 13:
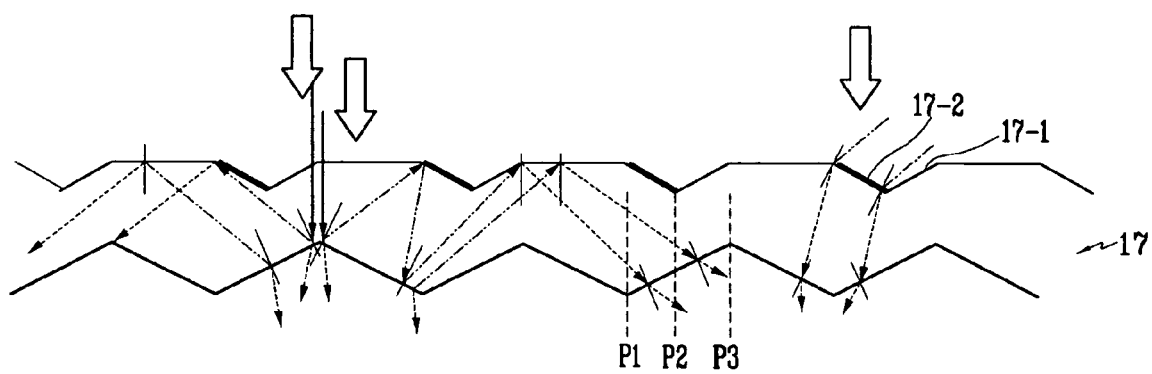
FIG. 13 is a schematic cross-sectional view of a functional transparent plate of an LCD according to another embodiment of the present invention.

FIG. 13 is a schematic cross-sectional view of a functional transparent plate of an LCD according to still another embodiment of the present invention.

Referring to FIG. 13, the functional transparent plate 17 of this embodiment has a top surface with first facets 17-1 and second facets 17-2 that are inwardly formed from the surface, and a prismatic bottom surface that is similar to the top surface of the functional transparent plate 17 of the previous embodiment. In this structure, it is preferable that first apexes P1 and second apexes P3 of the prismatic bottom surface and third apexes P2 of the top surface are positioned on different vertical lines from each other. This is because such a structure enables much of the reflected light to reach the cholesteric LC layer of the second facets 17-2, thus improving utilization efficiency of the light.

In this structure, an important problem is how to attach the functional transparent plate 17 with the prismatic bottom surface onto the second upper $\lambda/4$ retarder 16. Two possible methods are discussed below.

The first method is to directly form the second upper $\lambda/4$ retarder 16 on the bottom surface of the functional transparent plate 17. In this case, the second upper $\lambda/4$ retarder 16 is shaped as the bottom surface of the functional transparent plate 17. Accordingly, spaces are formed between the second upper $\lambda/4$ retarder 16 and the reflective polarizer 15. In the case that the functional transparent plate 17 and the second upper $\lambda/4$ retarder 16 are produced as separate films, an assembly process to bond the two films using an adhesive agent is further required. However, this method does not require such a process.

The second method is to attach the second upper $\lambda/4$ retarder 16 onto the reflective polarizer 15 and then to dispose the functional transparent plate 17 on the second upper $\lambda/4$ retarder 16. In this case, spaces are formed between the functional transparent plate 17 and the second upper $\lambda/4$ retarder 16.

In both methods, the spaces may be filled with the air. In this case, however, a problem may occur that light entering through an upper layer forming the spaces is totally reflected when impacting the air that fills the spaces, so the light does not reach a lower layer forming the spaces. To solve this problem, it is preferable to fill the spaces with a material with a refractive index that is very similar to an average of refractive indices of the upper layer and lower layer. For example, an organic silicon-based material, such as silicon resin or the like can be used as the filling material.

Instead of the functional transparent plates 17 as shown in FIG. 2 and FIG. 13, other functional transparent plates 17 having variously forms of modified top or bottom surfaces can be used. In all cases, it is preferable to form the first facets 17-1 and the second facets 17-2 at the functional transparent plate 17 to enable the total reflection to occur there, but it is not necessary that either surface of the functional transparent plate 17 has a planar structure or a prismatic structure. To optimize an optical system of the LCD, the form of the functional transparent plate 17 should be designed to allow the partial reflection and the total reflection to occur between the upper surface of the second upper $\lambda/4$ retarder 16 and the functional transparent plate 17 in desired manners. In other word, it is preferable to design the form of the functional transparent plate 17 in order for the functional transparent plate 17 to improve utilization efficiency of exterior light and display characteristics, such as viewing angle, contrast, and the like.

In the above-mentioned embodiment, the upper polarizer 22 is provided under the reflective polarizer 15. Here, the two polarizers 22 and 15 have the same transmission axes. Accordingly, even if the upper polarizer 22 is omitted, the results are not changed. In fact, the reflective polarizer 15 has a relatively low polarization performance compared with the upper polarizer 22 (which is an absorption-type polarizer). Accordingly, after passing through the reflective polarizer 15, light still contains a partial portion of a component that should ordinarily be reflected by the reflective polarizer. In the case that this phenomenon can be treated as a minor problem or the thickness of the LCD and the production cost are treated as the most important matters, the upper polarizer 22 may be omitted even though contrast of display images degrades.

In the above-mentioned embodiment, the TN LC material is used for the LC layer 3. However, a VA mode or an ECB mode LC material may also be used instead of the TN LC. Also, the common electrode 270 and the transparent electrodes 192 or the reflective electrodes 194 of the pixel electrodes 190 may be formed on the same insulating substrate using an in-plane switching technique.

Figure 14:
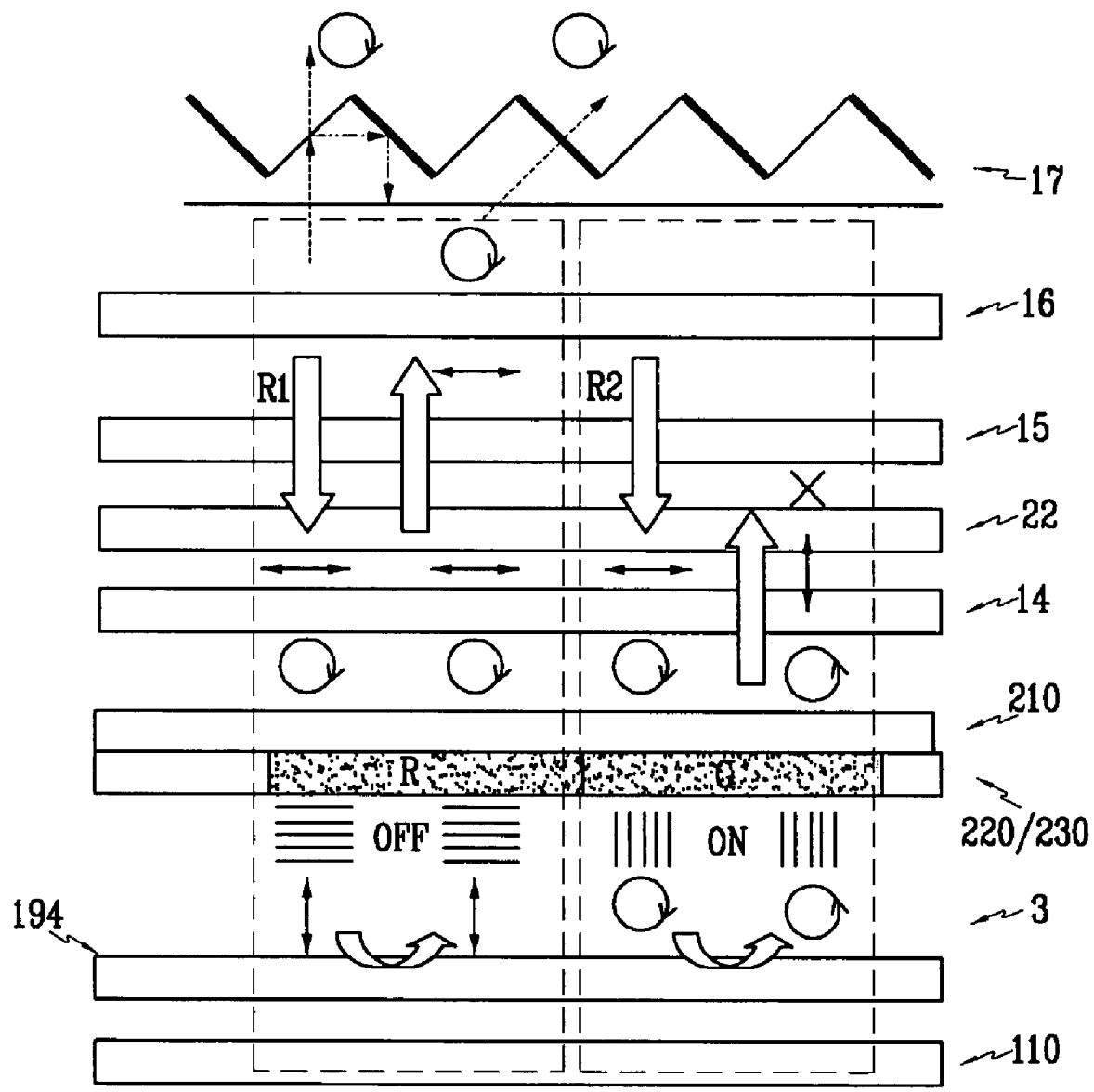
FIG. 14 is a cross-sectional view showing variations of the polarization state of light in a reflective LCD according to still another embodiment of the present invention.

FIG. 14 is a cross-sectional view showing variations of the polarization state of light in a reflective LCD according to still another embodiment of the present invention.

Differing from the LCD shown in FIG. 6, this LCD does not include the lower $\lambda/4$ retarder 13, the lower polarizer 12, or the backlight unit 500. In addition, this LCD does not require the transparent electrodes 192 because it is a reflective LCD.

Hereinafter, an LCD according to still another embodiment of the present invention will be described in detail with reference to FIG. 15 through FIG. 17.

Figure 15:
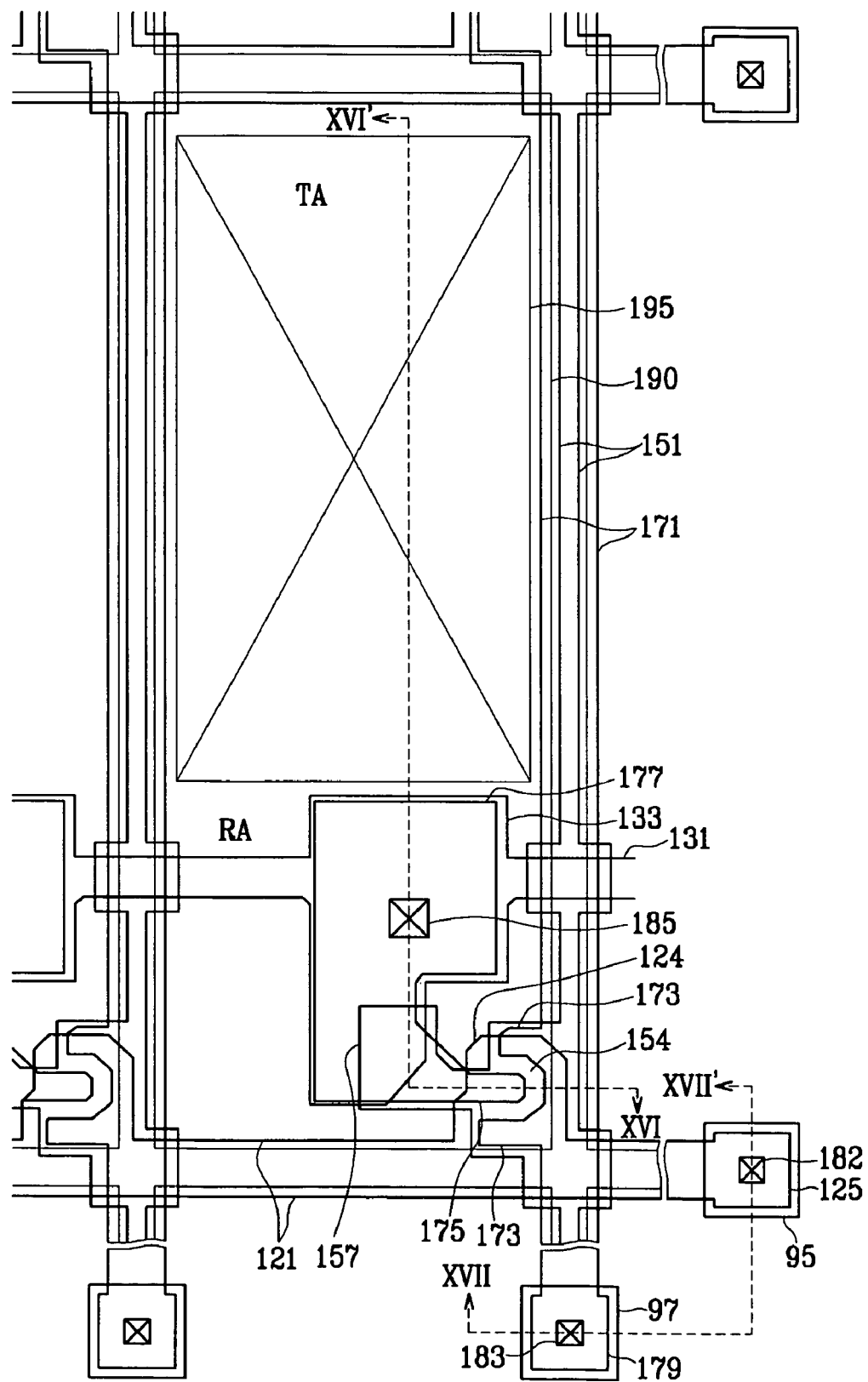
FIG. 15 is a layout view of an LCD according to still another embodiment of the present invention.
Figure 16:
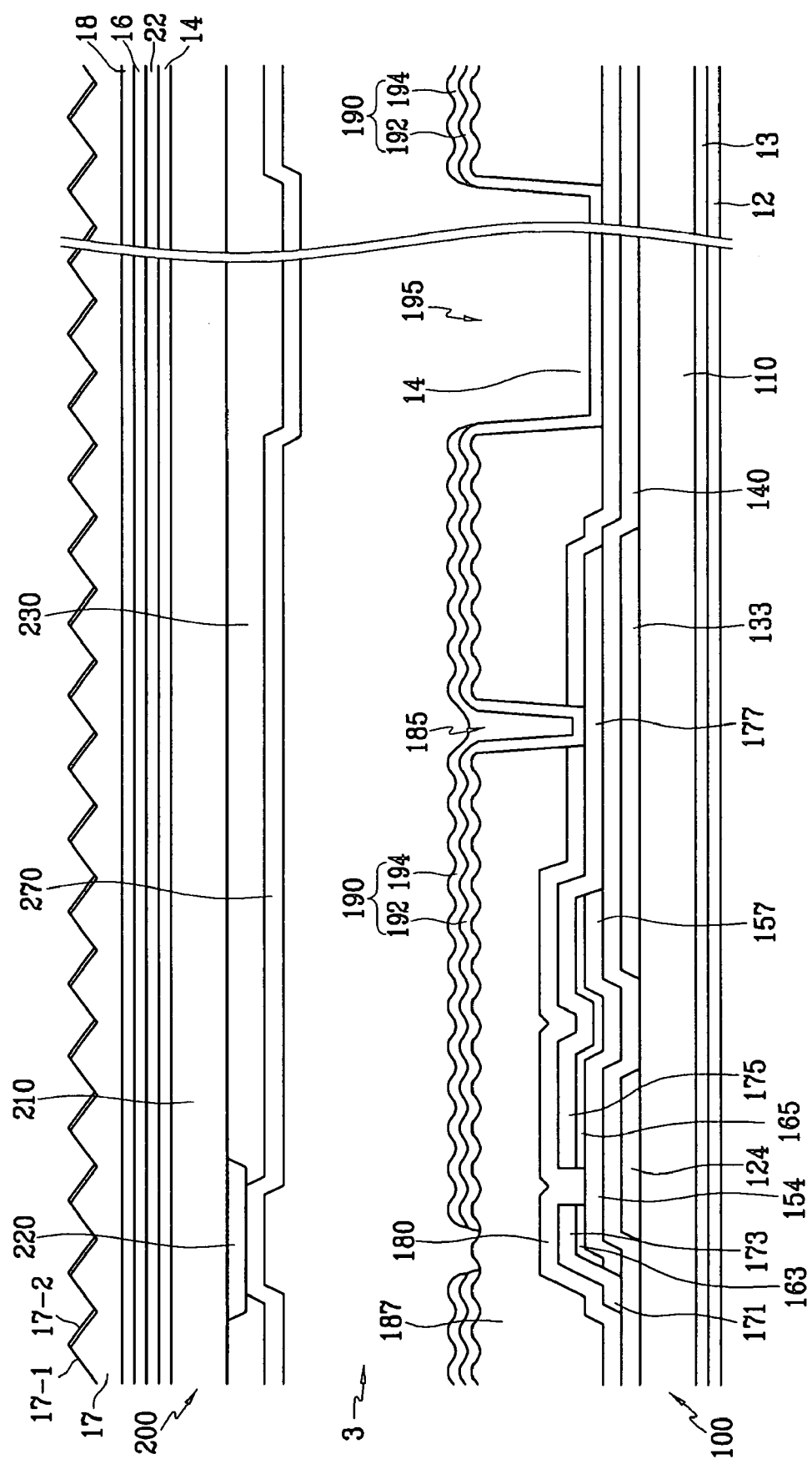
FIG. 16 is a schematic cross-sectional view cut along XVI-XVI' of FIG. 15.
Figure 17:
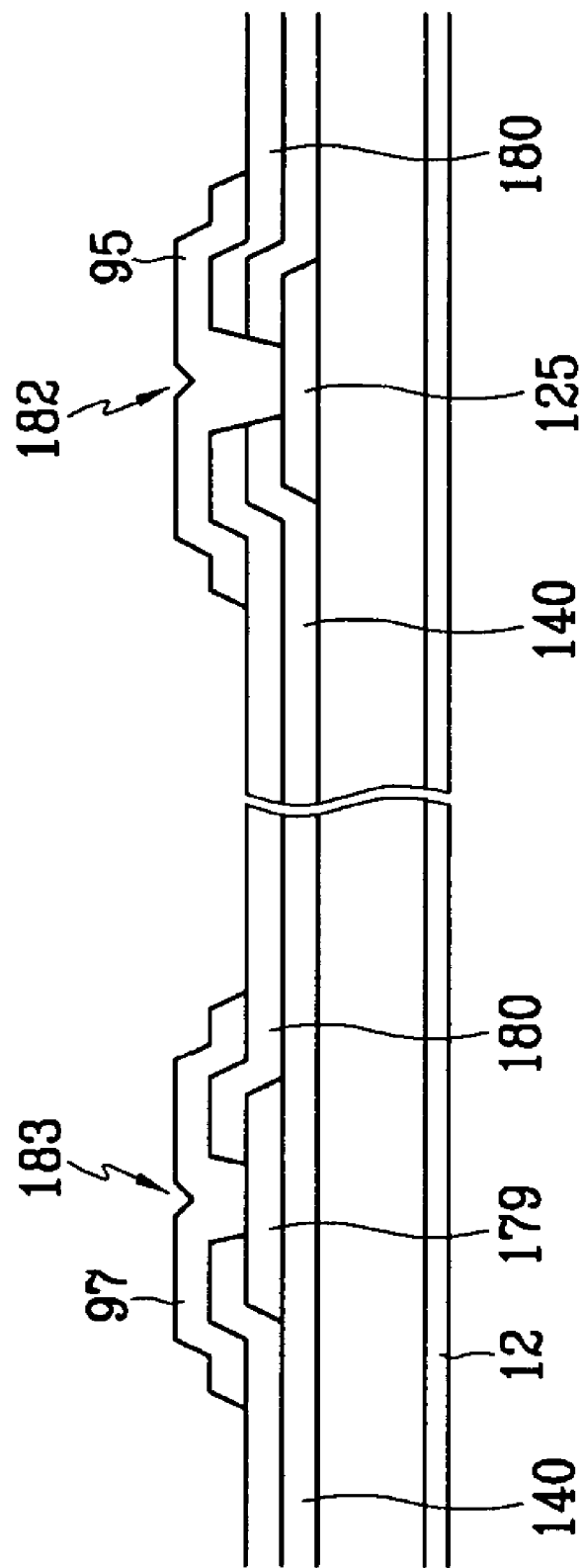
FIG. 17 is a schematic cross-sectional view cut along XVII-XVII' of FIG. 15.

FIG. 15 is a layout view of an LCD according to another embodiment of the present invention, and FIG. 16 and FIG. 17 are schematic cross-sectional views cut along XVI-XVI' and XVII-XVII' of FIG. 15, respectively.

Referring to FIG. 15 to FIG. 17, the LCD of this embodiment includes a TFT array panel 100 and a common electrode panel 200 facing each other, and an LC layer 3 that is interposed therebetween with LC molecules that are aligned perpendicular or parallel to the surfaces of the two panels 100 and 200.

LC molecules in the LC layer 3 may be aligned in a 90° twisted nematic (TN) mode, a vertical alignment (VA) mode, or an electrically controlled birefringence (ECB) mode.

The TFT array panel 100 is configured as follows.

A plurality of gate lines 121 and a plurality of storage electrode lines 131 are formed on an insulating substrate 110 made of transparent glass or plastic.

The gate lines 121 for transmitting gate signals extend substantially in a horizontal direction, while being separated from each other. Each gate line 121 includes a plurality of gate electrodes 124 protruding upward and an end portion 125 having a relatively large dimension to be connected to an external device.

The storage electrode lines 131 extend substantially in a horizontal direction and are substantially parallel to the gate lines 121. Each storage electrode line 131 includes a plurality of storage electrodes 133 protruding upward and downward. The storage electrode lines 131 receive a predetermined voltage, such as a common voltage that is applied to a common electrode 270 of the common electrode panel 200.

The gate lines 121 and the storage electrode lines 131 are preferably made of an aluminum-(Al) containing metal such as Al and an Al alloy, a silver-(Ag) containing metal such as Ag and a Ag alloy, a copper-(Cu) containing metal such as Cu and a Cu alloy, a molybdenum (Mo)-containing metal such as Mo and a Mo alloy, chrome (Cr), titanium (Ti), or tantalum (Ta). The gate lines 121 and the storage electrode lines 131 may be configured as a multi-layered structure, in which at least two conductive layers (not shown) having different physical properties are included. In such a structure, an upper layer of the two is made of a low resistivity metal, such as an Al-containing metal, a Ag-containing metal, a Cu-containing metal, or the like, in order to reduce delay of the signals or voltage drop in the gate lines 121 and the storage electrode lines 131, and a lower layer is made of material having prominent physical, chemical, and electrical contact properties with other materials such as indium tin oxide (ITO), indium zinc oxide (IZO), etc. For example, a Mo-containing metal, Cr, Ta, Ti, etc., may be used for the formation of the same layer. A desirable example of the combination of the two layers is a lower Cr layer and an upper Al—Nd layer. However, the gate lines 121 and the storage electrode lines 131 may be configured as single-layered structures.

All lateral sides of the gate lines 121 and the storage electrode lines 131 preferably slope in the range from about 20° to 80° to the surface of the substrate 110.

A gate insulating layer 140 made of $SiN_x$ or $SiO_2$ is formed on the gate lines 121 and the storage electrode lines 131.

A plurality of linear semiconductors 151 made of hydrogenated amorphous silicon (abbreviated as "a-Si") or polysilicon are formed on the gate insulating layer 140. Each linear semiconductor 151 extends substantially in a vertical direction and includes a plurality of projections 154 that extend along the respective gate electrodes 124 and a plurality of extensions 157 that extend from the respective projections 154. The linear semiconductors 151 are enlarged in the vicinities of the gate lines 121 and the storage electrode lines 131 to cover them entirely.

A plurality of linear ohmic contacts 161 and island-shaped ohmic contacts 165 are formed on the linear semiconductors 151. The ohmic contacts 161 and 165 may be made of N+ hydrogenated amorphous silicon that is highly doped with N-type impurities, or silicide. The linear ohmic contacts 161 include a plurality of projections 163. A set of a projection 163 and an island-shaped ohmic contact 165 is placed on the projection 154 of the semiconductor 151.

All lateral sides of the semiconductors 151 and the ohmic contacts 161 and 165 slope in the range from about 20° to 80° to the surface of the substrate 110.

A plurality of data lines 171 and a plurality of drain electrodes 175, separated from the data lines 171, are formed on the ohmic contacts 161 and 165 and the gate insulating layer 140.

The data lines 171 for transmitting data signals extend substantially in a vertical direction to be crossed with the gate lines 121 and the storage electrode lines 131. Each data line 171 includes an end portion 179 having a relatively large dimension to be connected to a different layer or an external device.

Each drain electrode 175 includes an expansion 177 that is overlapped with one of the storage electrodes 133. Each data line 171 further includes a plurality of source electrodes 173 protruding along and extending toward the respective gate electrodes 124. Each source electrode 173 surrounds a partial portion of a bar-shaped end portion of the drain electrode 175.

A gate electrode 124, a source electrode 173, a drain electrode 175, and a projection 154 of the semiconductor 151 form a thin film transistor (TFT). A TFT channel is formed in the projection 154 provided between the source electrode 173 and the drain electrode 175.

The data lines 171 and the drain electrodes 175 are preferably made of a refractory metal, such as a Mo-containing metal, a Cr-containing metal, Ta, Ti, or the like, and may be configured as multi-layered structures including a lower layer (not shown) consisting of one among Mo, a Mo alloy, Cr, etc., and an upper layer (not shown) consisting of an Al-containing metal.

Similarly to the gate lines 121 and the storage electrode lines 131, all lateral sides of the data lines 171 and the drain electrodes 175 slope in the range from about 20° to 80° to the surface of the substrate 110.

The ohmic contacts 161 and 165 exist only between the underlying semiconductors 151 and the overlying data lines 171 and between the overlying drain electrodes 175 and the underlying semiconductors 151, in order to reduce contact resistance therebetween. The linear semiconductors 151 are partially exposed at places where the data lines 171 and the drain electrodes 175 do not cover them, as well as between the source electrodes 173 and the drain electrodes 175.

A passivation layer 180, made of an inorganic material such as $SiN_x$ or $SiO_2$, is formed on the data lines 171, the drain electrodes 175, and the exposed portions of the semiconductors 151.

An organic insulating layer 187, made of a photosensitive organic insulator having a prominent planarization property, is formed on the passivation layer 180. A top surface of the organic insulating layer 187 is uneven. Due to the uneven surface, reflective electrodes 194 overlying the organic insulating layer 187 have uneven top surfaces. The uneven top surfaces of the reflective electrodes 194 prevent mirror reflection. Accordingly, images that may be shown on an LCD screen due to the mirror reflection are eliminated. The organic insulating layer 187 is removed at the end portions 125 and 179 of the gate lines 121 and the data lines 171, so only the passivation layer 180 remains on the end portions 125 and 179.

The passivation layer 180 is provided with a plurality of contact holes 183, through which the end portions 179 of the data lines 171 are exposed. A plurality of contact holes 182 are formed in the passivation layer 180 and the gate insulating layer 140, and the end portions 125 of the gate lines 121 are exposed therethrough. A plurality of contact holes 185 are formed in the passivation layer 180 and the organic insulating layer 187, and the expansions 177 of the drain electrodes 175 are exposed therethrough. The contact holes 182, 183, and 185 may have polygonal or circular shapes. The sidewalls of the contact holes 182, 183, and 185 slope in the range from about 30° to 85° to the surface of the substrate 110 or are shaped as steps.

A plurality of pixel electrodes 190 are formed on the organic insulating layer 187.

Each pixel electrode 190 includes a transparent electrode 192 and a reflective electrode 194 overlying the transparent electrode 192. The transparent electrodes 192 are made of a transparent conductive material such as ITO or IZO, and the reflective electrodes 194 are made of a reflective opaque material such as Al, an Al alloy, Ag, or a Ag alloy. Each pixel electrode 190 may further include a contact assistant (not shown) made of Mo, a Mo alloy, Cr, Ti, or Ta. The contact assistants ensure contact properties between the transparent electrodes 192 and the reflective electrodes 194, while preventing the transparent electrodes 192 from oxidizing the reflective electrodes 194.

Each pixel is divided into a transmission area TA without the reflective electrode 194 and a reflection area RA with the reflective electrode 194. The organic insulating layer 187 is removed at in the transmission area TA, so that a transmission window 195 is formed there. Due to the transmission window 195, a cell gap of the transmission area TA becomes nearly twice as large as that of the reflection area RA, so that a light path difference between the transmission area TA and the reflection area RA is compensated.

The pixel electrodes 190 are physically and electrically connected to the expansions 177 of the drain electrodes 175 through the contact holes 185 to receive data voltages from the drain electrodes 175. The pixel electrodes 190 supplied with the data voltages generate electric fields in cooperation with the common electrode 270 of the common electrode panel 200, determining the molecular orientation of the LC layer 3 interposed between the two electrodes.

Each set of the pixel electrode 190 and the common electrode 270 forms an LC capacitor that is capable of storing the applied voltage after the TFT is turned off. To enhance the voltage storage ability of the LC capacitors, storage capacitors, connected to the LC capacitors in parallel, are further provided. Overlapping of the expansions 177 of the drain electrodes 175 with the storage electrodes 133 implements the storage capacitors. Otherwise, overlapping of the pixel electrodes 190 with the gate lines 121 adjacent thereto may implement the storage capacitors. In this case, the storage electrode lines 131 may be omitted.

The pixel electrodes 190 may be overlapped with the data lines 171 adjacent thereto as well as the gate lines 121 adjacent thereto, in order to increase the aperture ratio, but such overlap portions are not always necessary.

The pixel electrodes 190 may be made of a transparent conductive polymer. However, opaque reflective metals may be used in reflective LCDs.

A plurality of contact assistants 95 and 97 are formed on the passivation layer 180 relating to a pad portion, and are individually connected to the end portions 125 of the gate lines 121 and the end portions 179 of the data lines 171 through the contact holes 182 and 183. The contact assistants 95 and 97 supplement adhesion between the end portions 125 and 179 and exterior devices, and to protect them. The contact assistants 95 and 97 may be formed on the same layer as the transparent electrodes 192 or the reflective electrodes 194. However, they may be omitted because they are not essential elements.

The common electrode panel 200 facing the TFT array panel 100 is configured as follows.

A light-blocking member 220 called a "black matrix" is provided on an insulating substrate 210 made of a transparent insulating material such as glass. The light-blocking member 220 prevents light from leaking out through barriers between the pixel electrodes 190 and delimits aperture regions facing the pixel electrodes 190.

A plurality of color filters 230 are formed on the substrate 210 and the light-blocking member 220, and most of them are placed within the aperture regions delimited by the light-blocking member 220. Each color filter 230 is formed between the two adjacent data lines 171 in a vertical direction, and exhibits one among red, green, and blue colors. The color filters 230 are connected to one another in the form of stripes.

In the case of a typical transflective LCD, in the transmission areas TA, light passes through the color filters 230 only once, while it passes twice in the reflection areas RA. Accordingly, a difference of color tone between the transmission areas TA and the reflection areas RA is generated. To reduce the difference of color tone between the two areas TA and RA, two methods can be used. The first method is to form the thickness of each color filter 230 differently depending on its location. That is, in this method, a portion of the color filter 230, which is placed at the transmission area TA, is formed thicker than the remaining portion, which is placed at the reflection area RA. The second method is to form light holes in the reflection areas RA of the color filters 230.

The common electrode 270, made of a transparent conductive material such as ITO or IZO, is formed on the light-blocking member 220 and the color filters 230.

The LC layer 3 is interposed between the two panels 100 and 200 facing each other.

A lower polarizer 12 and an upper polarizer 22 are individually attached to the outer surfaces of the two panels 100 and 200. A transmission axis (θ) of the upper polarizer 22 and a transmission axis (θ+90°) of the lower polarizer 12 are mutually crossed at a right angle.

A lower λ/4 retarder 13 is interposed between the TFT array panel 100 and the lower polarizer 12, and a first upper λ/4 retarder 14 is interposed between the common electrode panel 200 and the upper polarizer 22.

A second upper λ/4 retarder 16 is provided on the upper polarizer 22, and a selective reflection layer 18 is provided thereon.

A functional transparent plate 17 is provided on the selective reflection layer 18. A top surface of the functional transparent plate 17 consists of a plurality of prisms. Each prism includes a first facet 17-1, on which no additional material exists, and a second facet 17-2, on which a cholesteric LC layer exists.

Hereinafter, the structure of the above-mentioned LCD and the polarization principles of light in the same LCD will be described in detail.

Figure 18:
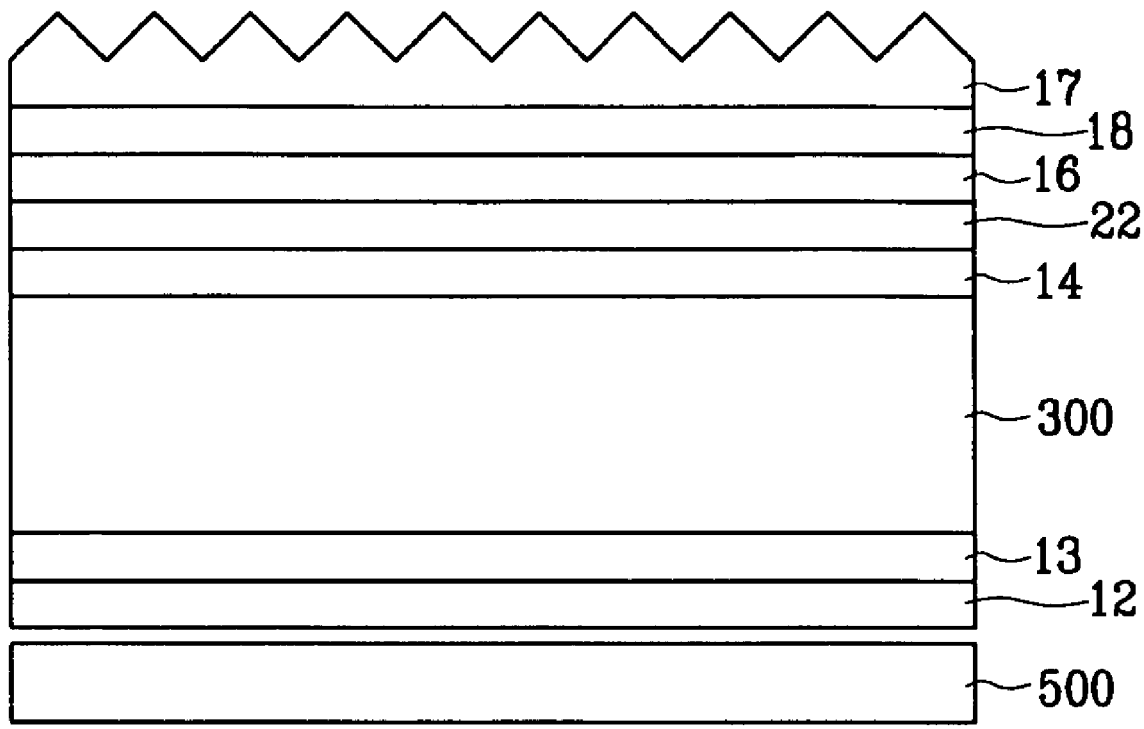
FIG. 18 shows a vertical scheme of an LCD according to still another embodiment of the present invention.

FIG. 18 shows a vertical scheme of an LCD of another embodiment of the present invention.

Referring to FIG. 18, a display panel assembly 300 comprises a TFT array panel 100 and a common electrode panel 200, and an LC layer 3 interposed therebetween.

The lower λ/4 retarder 13 is attached to a lower surface of the display panel assembly 300, and the lower polarizer 12 is attached to a lower surface of the lower λ/4 retarder 13.

Meanwhile, the first upper λ/4 retarder 14 is attached to an upper surface of the display panel assembly 300, and the upper polarizer 22 is attached to an upper surface of the first upper λ/4 retarder 14. The second upper λ/4 retarder 16 and the selective reflection layer 18 in this order are attached to an upper surface of the upper polarizer 22. The functional transparent plate 17, of which the top surface consists of the first sides 17-1 and second sides 17-2, is formed on the selective reflection layer 18.

Hereinafter, the above-mentioned structure will be described in more detail.

The polarizers 12 and 22 are individually attached to the outer surfaces of the panels 100 and 200. Their transmission axes are mutually crossed at a right angle. The polarizers 12 and 22 are absorption-type polarizers that transmit only linearly polarized incident light that vibrates parallel to their transmission axes and absorbs linearly polarized incident light that vibrates perpendicular to the axes.

The LCD of this embodiment utilizes three λ/4 retarders in all. Each of the three λ/4 retarders 13, 14, and 16 converts circularly polarized light into linearly polarized light or linearly polarized light into circularly polarized light by causing a phase difference of a quarter wavelength between two polarized components that are orthogonal to each other and are individually parallel to a fast axis and a slow axis thereof. The above-mentioned circularly polarized light may be elliptically polarized light in actuality, but the elliptically polarized light will be also referred to as circularly polarized light for convenience.

The fast axes of the three λ/4 retarders 13, 14, and 16 are preferably formed at ±45° to the transmission axes (θ and θ+90°) of the polarizers 12 and 22 to maximize the phase difference between the two polarized components. However, they may be disposed at different angles, except being disposed perpendicular to or parallel to each other.

The selective reflection layer 18 is attached to the upper surface of the second upper λ/4 retarder 16. The selective reflection layer 18 allows only circularly polarized light in a specific direction to pass, while reflecting circularly polarized light in a direction that is opposite to the specific direction. In this embodiment, the selective reflection layer 18, which selectively transmits the circularly polarized light, consists of cholesteric LC material. In detail, the selective reflection layer 18 transmits circularly polarized incident light rotating in the same direction as an optical axis of the cholesteric LC material, while reflecting circularly polarized incident light rotating in an opposite direction. In general, the cholesteric LC material can be aligned in various alignment manners. However, in this embodiment, a cholesteric LC material of a planar-alignment mode where spiral axes of LC molecules are aligned perpendicular to the surfaces of the substrates is preferably used, in order for the selective reflection layer 18 to selectively reflect or transmit the circularly polarized light. A fabrication method of the selective reflection layer 18 will be described later.

The functional transparent plate 17 is made of a transparent material and has a prismatic top surface consisting of a plurality of first facets 17-1 and a plurality of second facets 17-2, as shown in FIG. 16. No additional material exists on the first facets 17-1, while the cholesteric LC layer 3 exists on the second facets 17-2. The second facets 17-2 transmit circularly polarized incident light rotating in the same direction as the optical axis of the cholesteric LC layer, while reflecting circularly polarized incident light rotating in an opposite direction. A fabrication method of the first facets 17-1 and the second facets 17-2 will be described later.

The functional transparent plate 17, the selective reflection layer 18, the second upper λ/4 retarder 16, the upper polarizer 22, the first upper λ/4 retarder 14, the display panel assembly 300, the lower λ/4 retarder 13, and the lower polarizer 12 are bonded by an adhesive agent, in that order.

Figure 19:
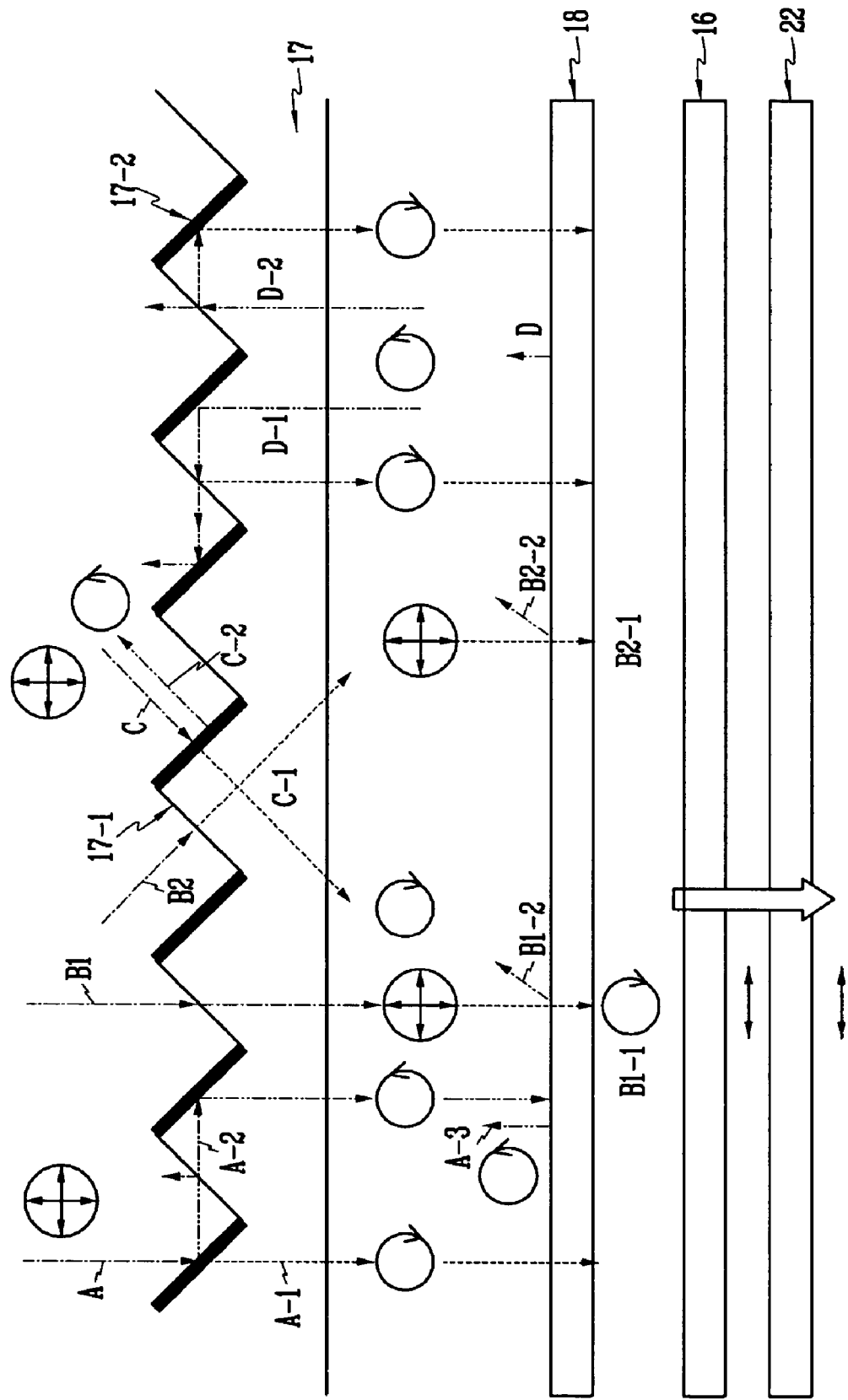
FIG. 19 shows variations of the polarization state of light at an upper part of an LCD according to still another embodiment of the present invention.

FIG. 19 shows variations of the polarization state of light at an upper part of the LCD with the functional transparent plate 17, the selective reflection layer 18, the second upper λ/4 retarder 16, and the upper polarizer 22.

As shown in FIG. 19, light that is incident onto the functional transparent plate 17 is divided into four light rays (A, B-1, B-2, and C) depending on incident position and incident angle.

Incident light (A) of the four is first described.

The light (A), which is incident onto the second facets 17-2 of the functional transparent plate 17, is separated into two individual light rays (A-1) and (A-2) having different light paths. That is, when the light (A) impacts the second facets 17-2 where the cholesteric LC layer is formed, right-handed circularly polarized light (A-1) of the incident light (A), which rotates in the same direction as the optical axis of the cholesteric LC layer, passes through the functional transparent plate 17, while left-handed circularly polarized light (A-2), which rotates in an opposite direction, is reflected.

The light (A-1) passing through the functional transparent plate 17 is then incident onto the selective reflection layer 18. At this time, the selective reflection layer 18 transmits the right-handed circularly polarized incident light (A-1) since it is designed to allow right-handed circularly polarized light to pass and to reflect left-handed circularly polarized light. Next, the right-handed circularly polarized light (A-1) travels through the second upper λ/4 retarder 16. At this time, the light (A-1) is converted into linearly polarized light in the X direction by the second upper λ/4 retarder 16. Next, the linearly polarized light (A-1) passes through the upper polarizer 22 whose transmission axis is in the X direction.

Meanwhile, the left-handed circularly polarized reflected light (A-2), reflected the second facets 17-2, passes through the first facets 17-1 and is then reflected again by an adjacent second facet 17-2. The polarization state of the light (A-2) is maintained with no change during these sequential processes. This is possible because the second facets 17-2 that are formed with the cholesteric LC material do not cause any change in the polarization state of the light when reflecting. Next, the left-handed circularly polarized light (A-2) is total reflected by the selective reflection layer 18. The light that is reflected by the selective reflection layer 18 is designated as (A-3) in FIG. 19.

Two light rays (B-1) and (B-2) of FIG. 19 are described below.

Both of the light rays (B-1) and (B-2) are incident onto the first facets 17-1 of the functional transparent plate 17, but have different incident angles. That is, the light (B-1) is slantingly incident onto the first facets 17-1 of the functional transparent plate 17, while the light (B-2) is perpendicularly incident onto the first facets 17-1. Regardless of the different incident angles, the two light rays (B-1) and (B-2) proceed along the same light path with the same polarization states after entering the functional transparent plate 17. In detail, the two light rays (B-1) and (B-2) pass through the functional transparent plate 17 with all-directional polarized components. Next, the light rays (B-1) and (B-2) are incident onto the selective reflection layer 18. At this time, the selective reflection layer 18 transmits only right-handed circularly polarized light rays (B1-1) and (B2-1) of the incident rays (B-1) and (B-2) and reflects the left-handed circularly polarized light rays (B1-2) and (B2-2). After this process, the right-handed circularly polarized light rays (B1-1) and (B2-1) enters the second upper λ/4 retarder 16, thereby being converted into linearly polarized light rays in the X direction. Then, the linearly polarized light rays (B1-1) and (B2-1) travel through the upper polarizer 22.

Next, light (C) of FIG. 19 is described.

The light (C) that is perpendicularly incident onto the second facets 17-2 of the functional transparent plate 17 is also divided into two separate light rays (C-1) and (C-2) having different light paths. That is, right-handed circularly polarized light (C-1) of the incident light (C), which rotates in the same direction as the optical axis of the cholesteric LC, passes through the functional transparent plate 17 and then proceeds along the same light path as the light (A-1), while left-handed circularly polarized light (C-2) of the incident light (C), which rotates in the opposite direction, is directed to the outside by reflection at the second facets 17-2.

Here, plane angles of the first facets 17-1 and the second facets 17-2 may be controlled so that the left-handed circularly polarized reflected light (C-2) is incident onto the first facets 17-1 again and enters the second upper λ/4 retarder 16 after being reflected or refracted by the functional transparent plate 17.

In the meantime, the left-handed circularly polarized light rays (A-3), (B1-2), and (B2-2), reflected by the selective reflection layer 18, enters the functional transparent plate 17 again. In this case, incident light is designated as (D) in FIG.

19. The light (D) is divided into two light rays (D-1) and (D-2) depending on incident positions of the light (D). That is, the light (D-2) is incident onto the first facets 17-1 of the functional transparent plate 17, while the light (D-1) is incident onto the second facets 17-2. The two light rays (D-1) and (D-2) are doubly reflected by the first facets 17-1 and the second facets 17-2, respectively. At this time, the light rays (D-1) and (D-2) undergo 180° phase changes with the reflection at the first facets 17-1, so that they are all converted into right-handed polarized light rays (D-1) and (D-2). Next, the right-handed polarized lights (D-1) and (D-2) enter the selective reflection layer 18 again. The selective reflection layer 18 transmits all the right-handed polarized light rays (D-1) and (D-2) without a change of the polarization state. Subsequently, the two light rays (D-1) and (D-2) travel though the second upper $\lambda/4$ retarder 16, while being converted into linearly polarized light rays in the X direction. Then, the linearly polarized lights (D-1) and (D-2) pass through the upper polarizer 22.

As described above, the light, which is incident from the ambient environment through the first facets 17-1 and the second facets 17-2 of the functional transparent plate 17, does not exit the LCD after being reflected by the selective reflection layer 18 and is returned to the selective reflection layer 18 again by changing its polarization direction, so that display luminance of the LCD in a reflection mode is improved. To accomplish this effect, it is preferable to design the functional transparent plate 17 so that the first facets 17-1 and the second facets 17-2 thereof represent the largest possible refractive index difference therebetween, both having largest possible dimensions. It is also preferable to form angles between the two facets 17-1 and 17-2 to be as large as possible. In the case that the difference of the refractive index between the exterior air and the functional transparent plate 17 is relatively large, no total reflection occurs when exterior light enters the functional transparent plate 17, but a total reflection occurs in the case when the light emerges from the functional transparent plate 17 toward the outside. Accordingly, utilization efficiency of the exterior light is improved.

Figure 20:
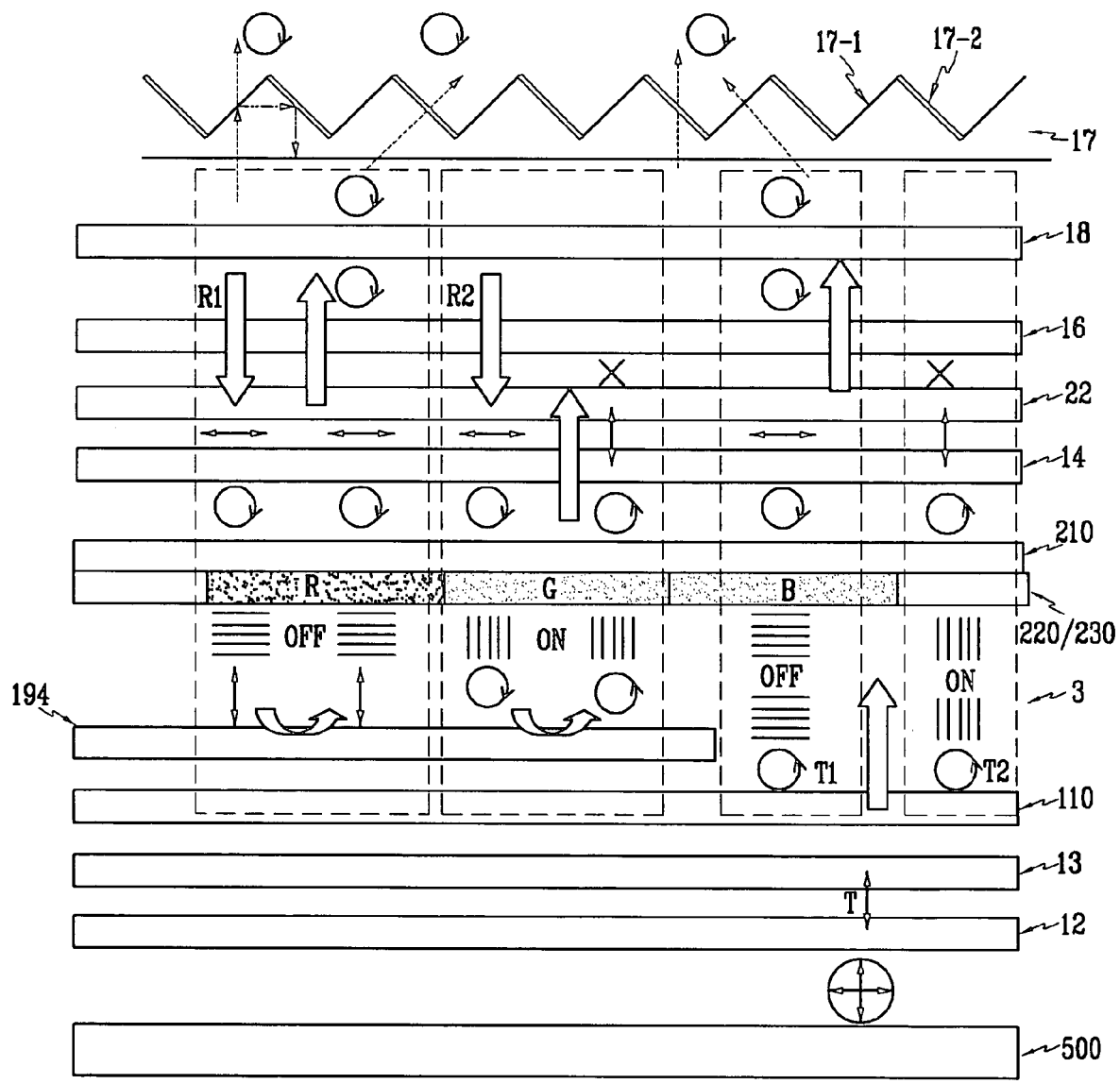
FIG. 20 is a view for comparing the polarization states of light when an LCD operates in a reflection mode utilizing exterior light and in a transmission mode utilizing internal light from a backlight unit.

FIG. 20 is a view for comparing the polarization states of light when the LCD operates in a reflection mode utilizing exterior light and in a transmission mode utilizing internal light from a backlight unit 500.

In this embodiment, the LC layer 3 consists of TN mode LC molecules. The TN LC molecules have peculiar optical properties. That is, they are aligned in a vertical direction when an electric field is applied, thereby causing no change in the polarization state of light passing through the LC layer 3, but they are aligned in a horizontal direction when no electric field is applied, thereby changing the polarization state of light passing through the LC layer 3.

Hereinafter, variations of the polarization states of light when no electric field is applied to the LC layer 3 will be first described with reference to FIG. 20.

In FIG. 20, leftmost light (R1) is incident light from the ambient environment when no electric field is applied to the LC layer 3 in a reflection mode. The light (R1) passes through the upper polarizer 22 as linearly polarized light in the X direction. Then, the linearly polarized light (R1) enters the first upper $\lambda/4$ retarder 14. At this time, the first upper $\lambda/4$ retarder 14 converts the light (R1) into right-handed circularly polarized light. The right-handed circularly polarized light (R1) enters the LC layer 3 after passing through the upper insulating substrate 210 and the color filters 230. In this case, since the LC layer 3 is supplied with no electric field, the light (R1) is converted into linearly polarized light in the Y direction. The linearly polarized light (R1) rotates by 180° with the reflection at the reflective electrode 194. However, the light (R1) maintains the polarization state without a change even after the rotation. The reflected light (R1) is converted into right-handed circularly polarized light again when passing through the LC layer 3, and then enters the first upper $\lambda/4$ retarder 14 after successively passing through the color filters 230 and the upper insulating substrate 210. At this time, the first upper $\lambda/4$ retarder 14 converts the right-handed circularly polarized light (R1) into linearly polarized light in the X direction. Next, the linearly polarized light (R1) enters the second upper $\lambda/4$ retarder 16 after passing through the upper polarizer 22. At this time, the linearly polarized light in the X direction (R1) is converted into right-handed circularly polarized light by the second upper $\lambda/4$ retarder 16. Subsequently, the right-handed circularly polarized light (R1) passes through the selective reflection layer 18 and the functional transparent plate 17 without a change of the polarization state, and then exits the LCD. At this time, the LCD screen is shown as a white state.

Meanwhile, light (T1) of FIG. 20 is light supplied from an internal light source of the LCD, i.e., the backlight unit 500, when no electric field is applied to the LC layer 3 in a transmission mode. First, the light (T) passes through the lower polarizer 13. In this step, only a linearly polarized component in the Y direction of the light (T) is transmitted and the remaining components are removed by absorption. The linearly polarized component in the Y direction (T) is converted into left-handed circularly polarized light (Ti) by the lower $\lambda/4$ retarder 13. The left-handed circularly polarized light (T1) enters the LC layer 3 after passing through the lower insulating substrate 110, and is then converted into right-handed circularly polarized light when passing through the LC layer 3. Next, the right-handed circularly polarized light (T1) passes through the color filters 230 and the upper insulating substrate 210 and then enters the first upper $\lambda/4$ retarder 14. At this time, the light (T1) is converted into linearly polarized light in the X direction by the first upper $\lambda/4$ retarder 14. Next, the linearly polarized light (T1) passes through the upper polarizer 22 and then enters the second upper $\lambda/4$ retarder 16, thereby being converted into right-handed circularly polarized light by the second upper $\lambda/4$ retarder 16. Subsequently, the right-handed circularly polarized light (T1) passes through the selective reflection layer 18 and the functional transparent plate 17 without a change of the polarization state, and then exits the LCD. At this time, the LCD screen is shown as a white state.

Hereinafter, variations of the polarization states in the case of the field-applied LC layer 3 will be described with reference to FIG. 20.

In FIG. 20, light (R2) is incident light from the ambient environment when an electric field is applied to the LC layer 3 in a reflection mode. The light (R2) passes through the upper polarizer 22 as linearly polarized light in the X direction. Next, the linearly polarized light in the X direction (R2) enters the first upper $\lambda/4$ retarder 14. At this time, the first upper $\lambda/4$ retarder 14 converts the light (R2) into right-handed circularly polarized light. The right-handed circularly polarized light (R2) enters the LC layer 3 after passing through the upper insulating substrate 210 and the color filters 230. In this case, the field-applied LC layer 3 does not cause a change in the polarization state of the light passing therethrough. Sequentially, the right-handed circularly polarized light (R2) rotates by 180° with the reflection at the reflective electrodes 194, thereby being converted into left-handed circularly polarized light. The left-handed circularly polarized light (R2), reflected by the reflective electrodes 194, passes through the LC layer 3 again without a change of the polarization state, and then enters the first upper λ/4 retarder 14 after passing through the color filters 230 and the upper insulating substrate 210. At this time, the first upper λ/4 retarder 14 converts the left-handed circularly polarized light (R2) into linearly polarized light in the Y direction. Next, the upper polarizer 22 absorbs all of the linearly polarized light in the Y direction (R2), so that no light exits the LCD. In this case, the LCD screen is shown as a black state.

Meanwhile, light (T2) of FIG. 20 is light supplied from an internal light source, i.e., a backlight unit 500, when an electric field is applied to the LC layer 3 in a transmission mode. The light (T) supplied from the backlight unit 500 passes through the lower polarizer 13. In this step, only a linearly polarized component in the Y direction of the light (T) remains and the remaining components are removed. The linearly polarized component in the Y direction (T) is converted into left-handed circularly polarized light (T2) by the lower λ/4 retarder 13. The left-handed circularly polarized light (T2) enters the LC layer 3 after passing through the lower insulating substrate 110, and then exits the LC layer 3 with no change of the polarization state. Next, the left-handed circularly polarized light (T2) passes through the color filters 230 and the upper insulating substrate 210, and then enters the first upper λ/4 retarder 14. At this time, the light (T2) is converted into linearly polarized light in the Y direction by the first upper λ/4 retarder 14. Next, the upper polarizer 22 completely absorbs the linearly polarized light in the Y direction (T2), so that no light exits the LCD. At this time, the LCD screen is shown as a black state.

As described above, regardless of the operation modes of the LCD, the LCD screen exhibits the black state when the field is applied to the LC layer 3, while it exhibits the white state when the field is not applied to the LC layer 3.

FIG. 21 through FIG. 24 are schematic cross-sectional views showing process steps to manufacture a selective reflection layer 18 of an LCD according to another embodiment of the present invention.

The selective reflection layer 18 is manufactured as follows.

Figure 21:
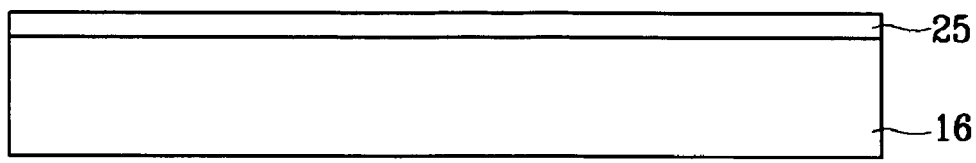
FIG. 21 through FIG. 24 are schematic cross-sectional views showing process steps to manufacture a selective reflection layer of an LCD according to still another embodiment of the present invention.
Figure 22:
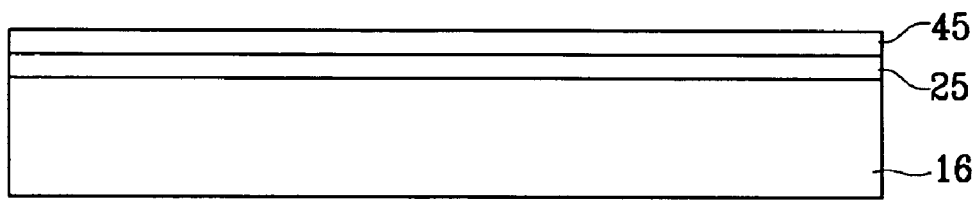
Figure 23:
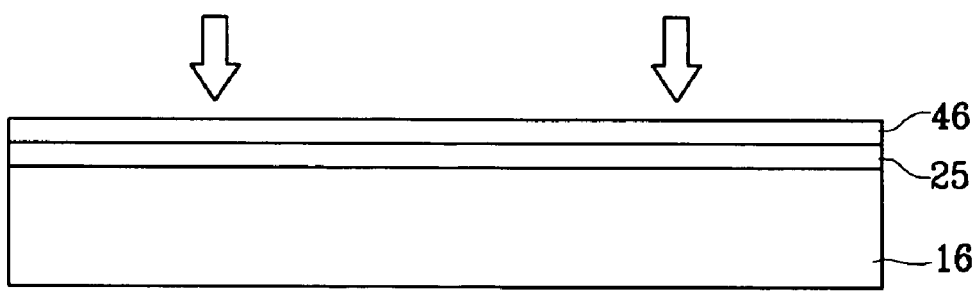
Figure 24:
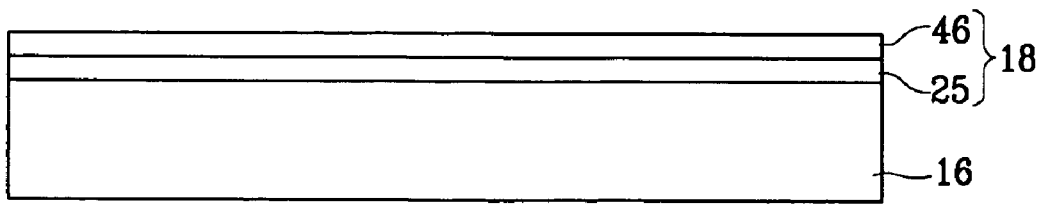

An optical alignment agent is first coated on a second upper λ/4 retarder 16, and is then exposed to light, thereby forming an optical alignment layer 25 as shown in FIG. 21. Next, as shown in FIG. 22, a cholesteric LC material 45 containing a UV cross-linking agent is coated over the optical alignment layer 25. At this time, it is preferable that molecules in the LC layer 3 have planar orientations. Subsequently, UV irradiation is applied to the resultant structure of FIG. 22, as shown in FIG. 23, to cure the cholesteric LC material 45. As a result, a cholesteric LC layer 46 is formed. The cholesteric LC layer 46 and the optical alignment layer 25 form a selective reflection layer 18, as shown in FIG. 24.

In the above, the selective reflection layer 18 is formed on the second upper λ/4 retarder 16, but it may be formed on a different substrate and separately prepared.

FIG. 25 through FIG. 30 are schematic cross-sectional views showing process steps to manufacture a functional transparent plate 17 of an LCD according to another embodiment of the present invention.

The functional transparent plate 17 is manufactured as follows.

Figure 25:
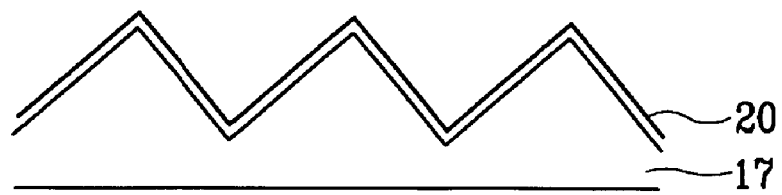
FIG. 25 through FIG. 30 are schematic cross-sectional views showing process steps to manufacture a functional transparent plate of an LCD according to still another embodiment of the present invention.
Figure 26:
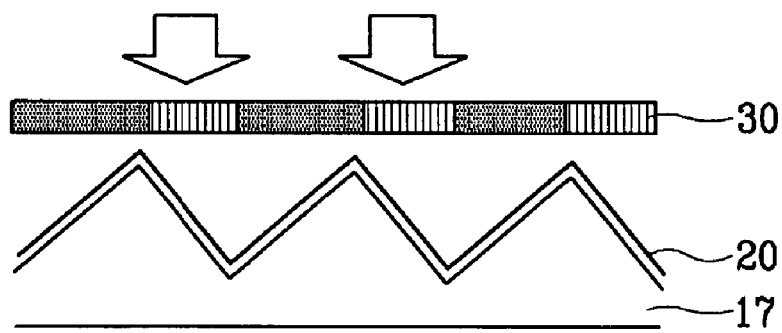
Figure 27:
Figure 28:
Figure 29:
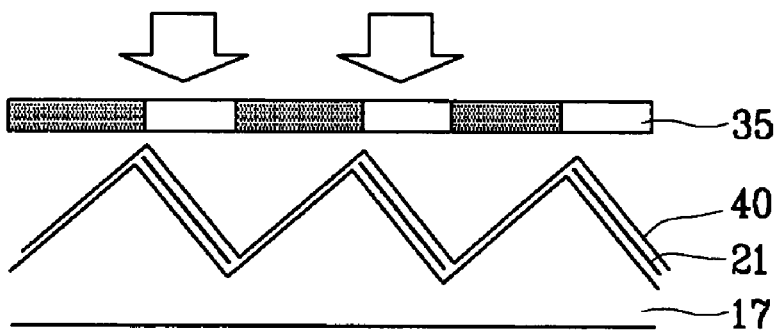
Figure 30:
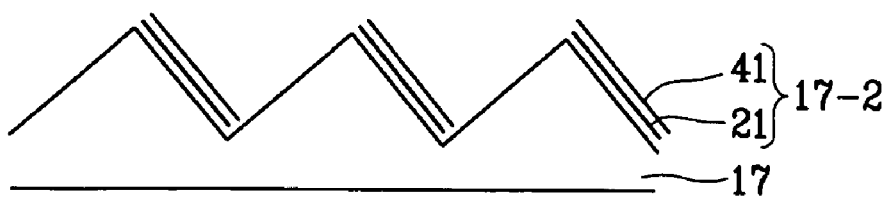

As shown in FIG. 25, after the functional transparent plate 17 with a prismatic top surface, which consists of first facets 17-1 and second facets 17-2, is first formed, an optical alignment agent 20 is coated thereon. The resultant structure of FIG. 25 then is selectively exposed to light through a first mask 30 as shown in FIG. 26. After exposure, a development process is performed. As a result, an optical alignment layer 21 is formed only on the second facets 17-2, as shown in FIG. 27. Subsequent to the formation of the optical alignment layer 21, a cholesteric LC material 40 is coated on the functional transparent plate 17, as shown in FIG. 28. Next, the resultant structure of FIG. 28 is selectively exposed to light through a second mask 35, as shown in FIG. 29. Then, as shown in FIG. 30, development and UV curing processes are successively performed, so that a cholesteric LC layer 41 is formed only on the second facets 17-2. As a result, each second facet 17-2 consists of the optical alignment layer 21 and the cholesteric LC layer 41.

Figure 31:
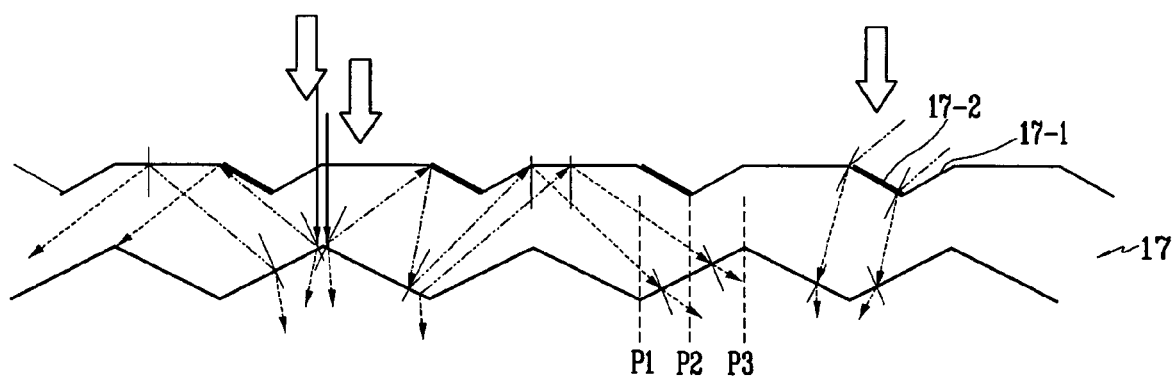
FIG. 31 is a schematic cross-sectional view of a functional transparent plate of an LCD according to still another embodiment of the present invention.

FIG. 31 is a schematic cross-sectional view of a functional transparent plate of an LCD according to still another embodiment of the present invention.

Referring to FIG. 31, the functional transparent plate 17 of this embodiment has a top surface with first facets 17-1 and second facets 17-2 that are inwardly formed from the surface thereof, and a prismatic bottom surface that is similar to the top surface of the functional transparent plate 17 of the previous embodiment. In this structure, it is preferable that first apexes P1 and second apexes P3 of the bottom surface and third apexes P2 of the top surface are positioned on different vertical lines from each other. This is because such a structure enables much of the reflected light to reach the cholesteric LC layer 41 of the second facets 17-2, thus improving utilization efficiency of the light.

In this structure, an important problem is how to attach the functional transparent plate 17 with the prismatic bottom surface onto the selective reflection layer 18. Two possible methods are discussed below.

The first method is to directly form the selective reflection layer 18 on the bottom surface of the functional transparent plate 17. In this case, the selective reflection layer 18 has the same form as the bottom surface of the functional transparent plate 17. Accordingly, spaces are formed between the selective reflection layer 18 and the second upper λ/4 retarder 16. In the case that the functional transparent plate 17 and the selective reflection layer 18 are produced as separated films, an assembly process to bond the two films using an adhesive agent is additionally required. However, this method does not require such a process.

The second method is to attach the selective reflection layer 18 onto the second upper λ/4 retarder 16 and then to dispose the functional transparent plate 17 thereon. In this case, spaces are formed between the selective reflection layer 18 and the functional transparent plate 17.

In both methods, the spaces may be filled with the air. In this case, however, a problem may occur in which light entering through an upper layer forming the spaces is totally reflected when impacting the air that fills the spaces, so the light does not reach a lower layer forming the spaces. To settle this problem, it is preferable to fill the spaces with a material with a refractive index that is very similar to an average of refractive indices of the upper layer and lower layer. For example, an organic silicon-based material, such as silicon resin or the like, can be used as the filling material.

Instead of the functional transparent plates 17 as shown in FIG. 16 and FIG. 31, other functional transparent plates 17 having variously forms of modified top or bottom surfaces can be used. In all cases, it is preferable to form the first facets 17-1 and the second facets 17-2 at the functional transparent plate 17 to enable the total reflection to occur at there, but it is not necessary that either surface of the functional transparent plate 17 has a planar structure or a prismatic structure. To optimize an optical system of the LCD, the form of the functional transparent plate 17 should be designed to allow the partial reflection and the total reflection to occur between the upper surface of the second upper λ/4 retarder 16 and the functional transparent plate 17 in desired manners. In other words, it is preferable to design the form of the functional transparent plate 17 in order for the functional transparent plate 17 to improve utilization efficiency of exterior light and display characteristics, such as viewing angle, contrast, and the like.

In the above-mentioned embodiment, the TN LC material is used for the LC layer 3. However, a VA mode or an ECB mode LC material may also be used instead of the TN LC. Also, the common electrode 270 and the transparent electrodes 192 or the reflective electrodes 194 of the pixel electrodes 190 may be formed on the same insulating substrate using an in-plane switching technique.

Figure 32:
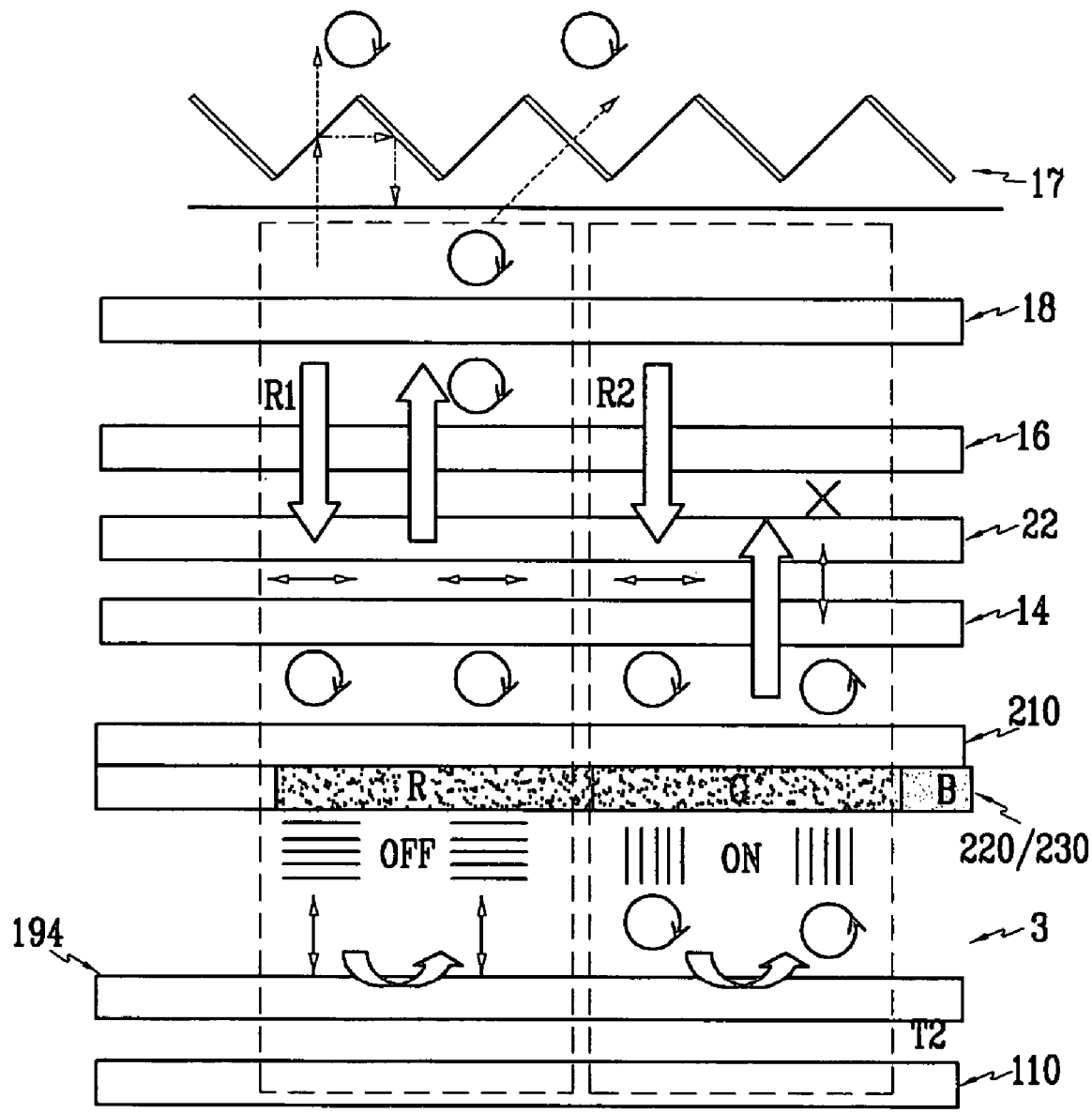
FIG. 32 is a cross-sectional view showing variations of the polarization state of light in a reflective LCD according to still another embodiment of the present invention.

FIG. 32 is a cross-sectional view showing variations of the polarization state of light in a reflective LCD according to still another embodiment of the present invention.

Differing from the transflective LCD of FIG. 20, this LCD does not include the lower λ/4 retarder 13, the lower polarizer 12, or the backlight unit 500. In addition, this LCD does not require the transparent electrodes 192 because it is a reflective LCD.

As described above, in the reflective or Tran missive LCD according to an aspect of the present invention, the reflective polarizer, the λ/4 retarder, and the functional transparent plate with the first facets and the second facets, which are disposed on the display panel assembly in that order, improve utilization efficiency of light incident from the ambient environment so that display luminance of the LCD operating in a reflection mode is improved.

Alternately, in the reflective or transmissive LCD according to another aspect of the present invention, the λ/4 retarder, the selective reflection layer, and the functional transparent plate with the first facets and the second facets, which are disposed on the display panel assembly in that order, improve utilization efficiency of light incident from ambient environment so that display luminance of the LCD operating a reflection mode is improved.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

What is claimed is:

1. A display device comprising:
 a display panel assembly;
 a reflective polarizer that is provided above the display panel assembly to transmit external incident light which is linearly polarized in a first direction and to reflect external incident light which is linearly polarized in a second direction perpendicular to the first direction;
 a second λ/4 retarder that is provided on the reflective polarizer; and
 a functional transparent plate that is provided on the second λ/4 retarder and which has a top surface including portions without a cholesteric liquid crystal material and portions with a cholesteric liquid crystal material.

2. The display device of claim 1, further comprising a first λ/4 retarder that is provided between the reflective polarizer and the display panel assembly.

3. The display device of claim 2, further comprising a first absorbing polarizer that is provided between a first λ/4 retarder and the reflective polarizer.

4. The display device of claim 1, further comprising a second absorbing polarizer that is provided under the display panel assembly.

5. The display device of claim 4, further comprises third λ/4 retarder that is provided between the second absorbing polarizer and the display panel assembly.

6. The display device of claim 1, wherein the reflective polarizer utilizes a dual brightness enhancement film (DBEF) that is produced based on reflectance anisotropy caused by refractive index anisotropy, or delicate linear patterns.

7. The display device of claim 1, further comprising a backlight unit that is provided under the display panel assembly.

8. The display device of claim 1, wherein the display panel assembly, the reflective polarizer, the first λ/4 retarder, and the functional transparent plate are bonded by an adhesive agent.

9. The display device of claim 1, wherein spaces are formed between the functional transparent plate and the second λ/4 retarder due to a surface structure of either of a bottom surface of the functional transparent plate or a top surface of the first λ/4 retarder, and the spaces are filled with a filling material with a refractive index that is equal to an average of refractive indices of the functional transparent plate and the second λ/4 retarder.

10. The display device of claim 9, wherein the filling material for the spaces comprises an organic silicon-based material such as silicon resin.

11. The display device of claim 1, wherein the display panel assembly includes an LC layer with LC molecules that are aligned in a 90.degree.-twisted nematic (TN) mode, a vertical alignment (VA) mode, an electrically controlled birefringence (ECB) mode, or an in-plane switching (IPS) mode.

12. The display device of claim 1, wherein the top surface of the functional transparent plate has a plurality of prisms consisting of first facets, on which a cholesteric liquid crystal layer does not exist, and second facets, on which a cholesteric liquid crystal exists.

13. The display device of claim 1, wherein the portions without the cholesteric liquid crystal material and the portions with the cholesteric liquid crystal material of the top surface of the functional transparent plate reflect light once, respectively, so that the reflected light is returned toward the second λ/4 retarder again.

14. The display device of claim 1, wherein the functional transparent plate has a top surface with an embossed carving or a depressed carving pattern and a bottom surface with an embossed carving or a depressed carving pattern, and apexes formed in the patterns of the two surfaces are formed to deviate from one another.

15. A display device comprising:
 a display panel assembly;
 a first λ/4 retarder that is provided on the display panel assembly;
 a reflective polarizer that is provided above the first λ/4 retarder to transmit incident light which is linearly polarized in a first direction and to reflect incident light which is linearly polarized in a second direction perpendicular to the first direction;
 a second λ/4 retarder that is provided on the reflective polarizer;
 a functional transparent plate that is provided on the second λ/4 retarder and which has a top surface with first facets and second facets, wherein the second facets transmit only a component of incident light which is polarized in a specific direction and reflect the remaining components;

a third λ/4 retarder that is provided under the display panel assembly; and a lower polarizer that is provided under the third λ/4 retarder.

16. The display device of claim 15, wherein the second facets that are formed at the top surface of the functional transparent plate have a cholesteric liquid crystal layer thereon.

17. The display device of claim 15, further comprising an upper polarizer that is provided between the first λ/4 retarder and the reflective polarizer.

18. The display device of claim 15, wherein the reflective polarizer utilizes a dual brightness enhancement film (DBEF) that is produced based on reflectance anisotropy caused by the refractive index anisotropy, or delicate linear patterns.

19. The display device of claim 18, further comprising a backlight unit that is provided under the lower polarizer.

20. The display device of claim 15, wherein the functional transparent plate, the second λ/4 retarder, the reflective polarizer, the first λ/4 retarder, the display panel assembly, the third λ/4 retarder, and the lower polarizer are bonded by an adhesive agent.

21. The display device of claim 15, wherein spaces are formed between the functional transparent plate and the second λ/4 retarder due to a surface structure of either of a bottom surface of the functional transparent plate or a top surface of the second λ/4 retarder, and the spaces are filled with a filling material with a refractive index that is equal to an average of refractive indices of the functional transparent plate and the second λ/4 retarder.

22. The display device of claim 21, wherein the filling material for the spaces comprises an organic silicon-based material such as silicon resin.

23. The display device of claim 15, wherein the second facets which are formed at the top surface of the functional transparent plate only transmit either of a right-handed circularly polarized component or a left-handed circularly polarized component of incident light and reflect the remaining components.

24. The display device of claim 15, wherein the top surface of the functional transparent plate has a prismatic structure including the first facets, on which a cholesteric liquid crystal layer does not exist, and the second facets, on which a cholesteric liquid crystal exists.

25. The display device of claim 15, wherein the first facets and the second facets which are formed at the top surface of the functional transparent plate reflect light which is incident from the second λ/4 retarder once, respectively, so that the reflected light is returned toward the second λ/4 retarder again.

26. The display device of claim 15, wherein the functional transparent plate has a top surface with an embossed carving or a depressed carving pattern and a bottom surface with an embossed carving or a depressed carving pattern, and apexes formed in the patterns of the two surfaces are formed to deviate from one another.

27. A display device comprising:
a display panel assembly;
a first λ/4 retarder that is provided on the display panel assembly;
a reflective polarizer that is provided above the first λ/4 retarder to transmit incident light which is linearly polarized in a first direction and to reflect incident light which is linearly polarized in a second direction perpendicular to the first direction;
a second λ/4 retarder that is provided on the reflective polarizer; and a functional transparent plate that is provided on the second λ/4 retarder and which has a top surface with first facets and second facets, wherein the second facets transmit only a component of incident light which is polarized in a specific direction and reflect the remaining components.

28. The display device of claim 27, wherein the second facets which are formed at the top surface of the functional transparent plate have a cholesteric liquid crystal layer thereon.

29. The display device of claim 27, wherein the second facets which are formed at the top surface of the functional transparent plate only transmit either of a right-handed circularly polarized component or a left-handed circularly polarized component of incident light and reflect the remaining components.

30. The display device of claim 27, wherein the top surface of the functional transparent plate has a prismatic structure including the first facets, on which a cholesteric liquid crystal layer does not exist, and the second facets, on which a cholesteric liquid crystal exists.

31. The display device of claim 27, wherein the functional transparent plate has a top surface with an embossed carving or a depressed carving pattern and a bottom surface with an embossed carving or a depressed carving pattern, and apexes formed in the patterns of the two surfaces are formed to deviate from one another.

32. The display device of claim 27, wherein the first facets and the second facets which are formed at the top surface of the functional transparent plate reflect light which is incident from the second λ/4 retarder once, respectively, so that the reflected light is returned toward the second λ/4 retarder again.

33. The display device claim 27, wherein spaces are formed between the functional transparent plate and the second λ/4 retarder due to a surface structure of either of a bottom surface of the functional transparent plate or a top surface of the second λ/4 retarder, and the spaces are filled with a filling material with a refractive index that is equal to an average of refractive indices of the functional transparent plate and the second λ/4 retarder.

34. The display device of claim 33, wherein the filling material for the spaces comprises an organic silicon-based material such as silicon resin.

35. A display device comprising:
a display panel assembly;
a selective reflection layer that is provided above the display panel assembly to transmit a component of exterior incident light which is circularly polarized in a first direction and to reflect a component of exterior incident light which is circularly polarized in a second direction perpendicular to the first direction; and
a functional transparent plate that is provided on the selective reflection layer and which has a top surface including portions without a cholesteric liquid crystal material and portions with a cholesteric liquid crystal material.

36. The display device of claim 35, further comprising a first polarizer that is provided between the selective reflection layer and the display panel assembly.

37. The display device of claim 36, further comprising a first λ/4 retarder that is provided between the first polarizer and the display panel assembly.

38. The display device of claim 36, further comprising a second λ/4 retarder that is provided between the selective reflection layer and the first polarizer.

39. The display device of claim 35, further comprising a second polarizer that is provided under the display panel assembly.

40. The display device of claim 39, further comprising a third λ/4 retarder that is provided between the second polarizer and the display panel assembly.

41. The display device of claim 35, wherein the selective reflection layer is formed of a cholesteric liquid crystal material.

42. The display device of claim 35, further comprising a backlight unit that is provided under the display panel assembly.

43. The display device of claim 35, wherein the display panel, the selective reflection layer, and the functional transparent plate are bonded using an adhesive agent.

44. The display device of claim 35, wherein spaces are formed between the functional transparent plate and the selective reflection layer due to a surface structure of either of a bottom surface of the functional transparent plate or a top surface of the selective reflection layer, and the spaces are filled with a filling material with a refractive index that is equal to an average of refractive indices of the functional transparent plate and the selective reflection layer.

45. The display device of claim 44, wherein the filling material for the spaces comprises an organic silicon-based material such as silicon resin.

46. The display device of claim 35, wherein the display panel assembly includes an LC layer with LC molecules that are aligned in a 90.degree.-twisted nematic (TN) mode, a vertical alignment (VA) mode, an electrically controlled birefringence (ECB) mode, or an in-plane switching (IPS) mode.

47. The display device of claim 35, wherein the top surface of the functional transparent plate has a plurality of prisms consisting of first facets, on which a cholesteric liquid crystal layer does not exist, and second facets, on which a cholesteric liquid crystal exists.

48. The display device of claim 35, wherein the first facets and the second facets formed at the top surface of the functional transparent plate reflect light which is incident from the selective reflection layer once, respectively, so that the reflected light is returned toward the selective reflection layer again.

49. The display device of claim 35, wherein the functional transparent plate has a top surface with an embossed carving or a depressed carving pattern and a bottom surface with an embossed carving or a depressed carving pattern, and apexes formed in the patterns of the two surfaces are formed to deviate from one another.

50. A display device comprising:
a display panel assembly;
a first λ/4 retarder that is provided on the display panel assembly;
a first polarizer that is provided on the first λ/4 retarder, wherein the first polarizer transmits external incident light which is linearly polarized in a first direction and reflects external incident light which is linearly polarized in a second direction perpendicular to the first direction;
a second λ/4 retarder that is provided on the first polarizer;
a selective reflection layer that is provided on the second λ/4 retarder to transmit a component of incident light which is circularly polarized in a third direction and to reflect a component of incident light which is circularly polarized in a fourth direction perpendicular to the third direction;
a functional transparent plate that is provided on the selective reflection layer and which has a top surface with first facets and second facets, wherein the second facets transmit only a component of incident light which is polarized in a specific direction and reflect the remaining components;
a third λ/4 retarder that is provided under the display panel assembly; and
a second polarizer that is provided under the third λ/4 retarder.

51. The display device of claim 50, wherein the second facets which are formed at the top surface of the functional transparent plate have a cholesteric liquid crystal layer thereon.

52. The display device of claim 50, wherein the selective reflection layer is formed of a cholesteric liquid crystal material.

53. The display device of claim 50, farther comprising a backlight unit that is provided under the second polarizer.

54. The display device of claim 50, wherein the functional transparent plate, the selective reflection layer, the second λ/4 retarder, the first polarizer, the first λ/4 retarder, the display panel assembly, the third λ/4 retarder, and the second polarizer are bonded by an adhesive agent.

55. The display device of claim 50, wherein spaces are formed between the functional transparent plate and the selective reflection layer due to a surface structure of either of a bottom surface of the functional transparent plate or a top surface of the selective reflection layer, and the spaces are filled with a filling material with a refractive index that is equal to an average of refractive indices of the functional transparent plate and the selective reflection layer.

56. The display device of claim 55, wherein the filling material for the spaces comprises an organic silicon-based material such as silicon resin.

57. The display device of claim 50, wherein the second facets which are formed at the top surface of the functional transparent plate only transmit either of a right-handed circularly polarized component or a left-handed circularly polarized component of incident light and reflect the remaining components.

58. The display device of claim 50, wherein the top surface of the functional transparent plate has a prismatic structure including the first facets, on which a cholesteric liquid crystal layer does not exist, and the second facets, on which a cholesteric liquid crystal exists.

59. The display device of claim 50, wherein the first facets and the second facets which are formed at the top surface of the functional transparent plate reflect light which is incident from the selective reflection layer once, respectively, so that the reflected light is returned toward the selective reflection layer again.

60. The display device of claim 50, wherein the functional transparent plate has a top surface with an embossed carving or a depressed carving pattern and a bottom surface with an embossed carving or a depressed carving pattern, and apexes formed in the patterns of the two surfaces are formed to deviate from one another.

61. A display device comprising:
a display panel assembly;
a first λ/4 retarder that is provided on the display panel assembly;
a first polarizer that is provided on the first λ/4 retarder, wherein the first polarizer transmits light which is linearly polarized in a first direction and reflects light which is linearly polarized in a second direction perpendicular to the first direction;
a second λ/4 retarder that is provided on the first polarizer;

a selective reflection layer that is provided on the second λ/4 retarder to transmit light which is circularly polarized in a third direction and to reflect light which is circularly polarized in a fourth direction opposite to the third direction; and a functional transparent plate that is provided on the selective reflection layer and which has a top surface with first facets and second facets, wherein the second facets transmit only light which is polarized in a specific direction and reflect the remaining light.

62. The display device of claim 61, wherein the second facets which are formed at the top surface of the functional transparent plate have a cholesteric liquid crystal layer thereon.

63. The display device of claim 61, wherein the second facets which are formed at the top surface of the functional transparent plate only transmit either of a right-handed circularly polarized component or a left-handed circularly polarized component of incident light and reflect the remaining components.

64. The display device of claim 61, wherein the top surface of the functional transparent plate has a prismatic structure including the first facets, on which a cholesteric liquid crystal layer does not exist, and the second facets, on which a cholesteric liquid crystal exists.

65. The display device of claim 61, wherein the first facets and the second facets which are formed at the top surface of the functional transparent plate reflect light which is incident from the selective reflection layer once, respectively, so that the reflected light is returned toward the selective reflection layer again.

66. The display device of claim 61, wherein the functional transparent plate has a top surface with an embossed carving or a depressed carving pattern and a bottom surface with an embossed carving or a depressed carving pattern, and apexes of the patterns of the two surfaces are formed to deviate from one another.

67. The display device of claim 61, wherein spaces are formed between the functional transparent plate and the selective reflection layer due to a surface structure of either of a bottom surface of the functional transparent plate or a top surface of the selective reflection layer, and the spaces are filled with a filling material with a refractive index that is equal to an average of refractive indices of the functional transparent plate and the selective reflection layer.

68. The display device of claim 67, wherein the filling material for the spaces comprises an organic silicon-based material such as silicon resin.

* * * * *